(12) United States Patent
Deyaf et al.

(10) Patent No.: US 11,312,332 B1
(45) Date of Patent: Apr. 26, 2022

(54) REMOTE EMERGENCY VEHICLE DEVICE MANAGEMENT AND DIAGNOSTICS

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 17/544,327

(22) Filed: Dec. 7, 2021

(51) Int. Cl.
| | | |
|---|---|---|
| *B60R 25/24* | (2013.01) | |
| *B60R 25/104* | (2013.01) | |
| *G07C 9/00* | (2020.01) | |
| *G08B 21/24* | (2006.01) | |
| *G06Q 10/00* | (2012.01) | |
| *G06Q 10/08* | (2012.01) | |
| *B60R 25/10* | (2013.01) | |

(52) U.S. Cl.
CPC .......... *B60R 25/241* (2013.01); *B60R 25/104* (2013.01); *G06Q 10/087* (2013.01); *G06Q 10/20* (2013.01); *G07C 9/00857* (2013.01); *G08B 21/24* (2013.01); *B60R 2025/1013* (2013.01); *B60R 2225/00* (2013.01); *G07C 2009/0088* (2013.01); *G07C 2009/00865* (2013.01)

(58) Field of Classification Search
CPC ................ B60R 25/104; B60R 25/241; B60R 2025/1013; B60R 2225/00; G06Q 10/087; G06Q 10/20; G07C 9/00309; G07C 9/00571; G07C 9/00857; G07C 2009/00865; G07C 2009/0088; G08B 21/24; H04W 12/06; H04W 12/08

See application file for complete search history.

(56) References Cited

U.S. PATENT DOCUMENTS

| | | | | |
|---|---|---|---|---|
| 2019/0368233 | A1* | 12/2019 | Gengler | .............. E05B 47/0611 |
| 2020/0339064 | A1* | 10/2020 | Gengler | ............. G07C 9/00571 |
| 2021/0084458 | A1* | 3/2021 | Arena | ................ G06Q 10/0832 |
| 2021/0142588 | A1* | 5/2021 | Arena | ................ G07C 9/00896 |
| 2021/0319639 | A1* | 10/2021 | Ho | ...................... H04L 63/0861 |

* cited by examiner

*Primary Examiner* — Orlando Bousono

(57) ABSTRACT

Examples provide a system and method for remote management of lockable devices associated with emergency vehicles. A lockable device is a device, such as a multicolor light device or a siren device having one or more available functions which are initially placed in a locked state at the time of manufacture. A user can unlock the locked functions by logging into a remote device manager on a user device while the locked device is connected to the user device. The user selects one or more locked functions to unlock. The remote device manager generates a unique unlock code for each locked function selected for unlock. The unlock code is returned to the user device for utilization in unlocking the selected functions. The unlock code enables operation of the locked function. A lock status is updated to indicate which functions have been unlocked.

20 Claims, 19 Drawing Sheets

REMOTE EMERGENCY VEHICLE DEVICE MANAGEMENT AND DIAGNOSTICS

BACKGROUND

Emergency vehicles typically include lightbars and siren devices to warn the public of an approaching emergency vehicle, provide additional lighting and/or security. Some lightbars and siren devices have multiple types and functions. For example, different types of lightbars include single color, bi-color, tri-color or quad color. A single color lightbar only includes lights of one single color. A bi-color or dual color lightbar includes two colors. A tri-color light has three colors and a quad color lightbar has four colors. Quad color lightbars typically include the colors white, red, blue, and amber. The more lights included on the lightbar the more expensive the device is to manufacture and/or purchase. In other words, a single-color light is more affordable to produce or obtain than a quad color lightbar. However, producing multiple distinct types of lightbars (single color, bi-color, tri-color and quad color) can be burdensome and inefficient for manufacturers. If a manufacturer chooses to produce only a single type of lightbar they risk losing consumers that want to purchase a different lightbar type. Moreover, lightbar types in less demand reduce inventory space which would otherwise be allocated to higher demand lightbar types.

SUMMARY

Some examples provide a system and method for remote management of lockable devices associated with emergency vehicles. A lockable device, such as a multicolor lightbar or a siren device designed for installation on an emergency vehicle has one or more functions that are locked. The locked function(s) remain inoperable until the function is unlocked. A unique identifier (UID) is assigned to each lockable device. When a user is ready to license the locked function, the lockable device is communicatively coupled to a user device. The user generates configuration data specifying the selected function to license via a portal page accessed via the user device. A remote device management server receives the configuration data from the user device and generates an unlock code corresponding to the configuration data. The unlock code is sent to the user device to enable the user device to unlock the licensed function on the selected lockable device. The unlock code is a unique per-device code that enables operation of the available function in response to the selected lockable device receiving the unlock code. The lock status of the function is updated in an aggregated data store storing function-related data for one or more available functions associated with one or more lockable devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
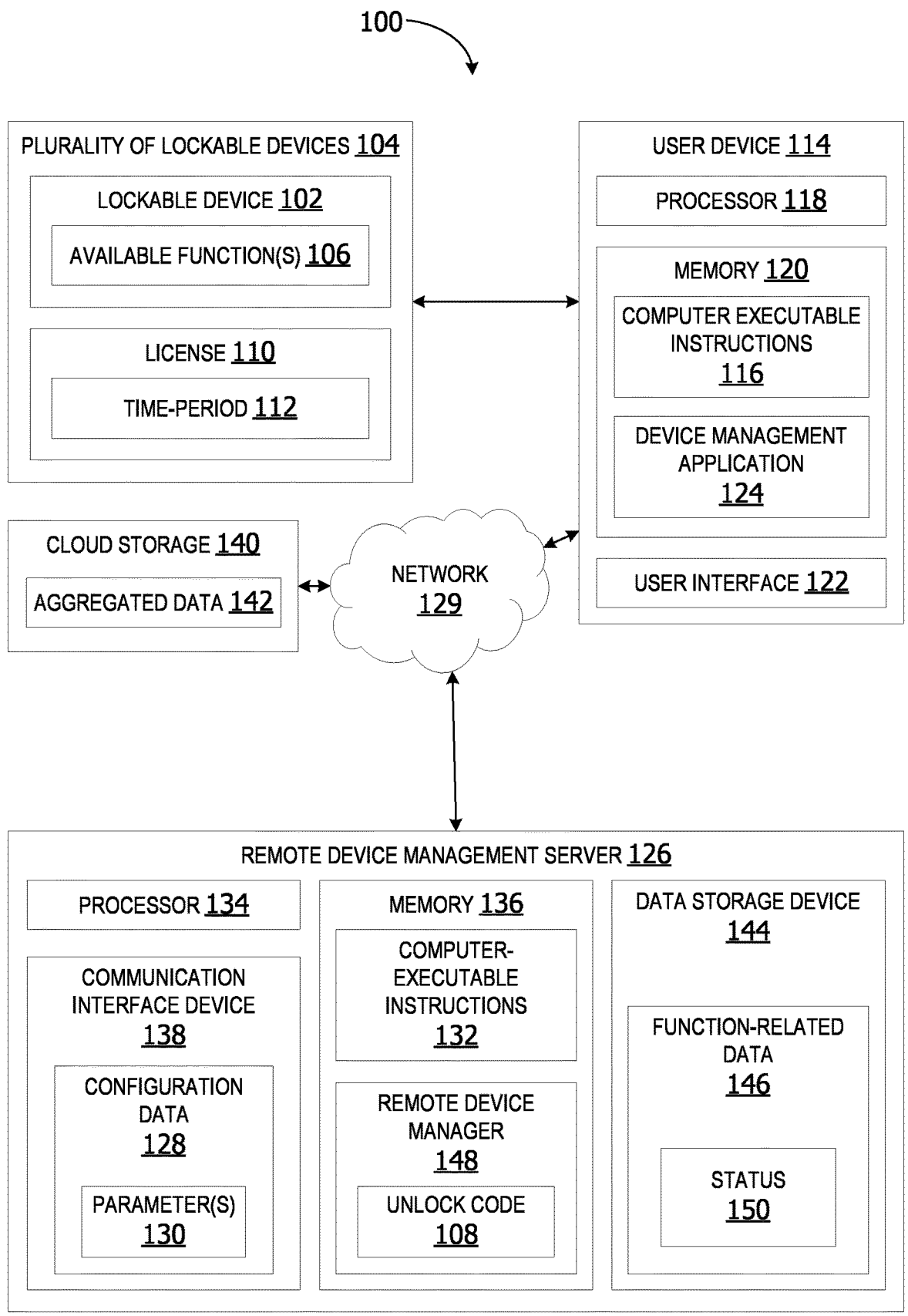
FIG. 1 is an exemplary block diagram illustrating a system for remote management of lockable devices associated with emergency vehicles.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable remote management of available functions on multicolor lightbars and siren devices configured for installation on emergency vehicles. In some examples, a remote device manager enables customizable and configurable licensing of lockable functions on emergency vehicle devices to reduce costs associated with device purchase and installation while providing the maximum number of available function options to meet user needs.

The lockable device manager, in some examples, aggregates device related data from a plurality of lockable devices. The aggregate data, in some examples, is searched and/or sorted in accordance with one or more user criteria or other search parameters to identify commonalities, such as, but not limited to, common maintenance tasks, licensing trends, and commonly requested services across devices/users to improve product quality and customer satisfaction while reducing costs for users.

Aspects of the disclosure enable remote generation of unlock codes to unlock functions on a multicolor light device or siren device. In this manner, a quad control light device can be sold to dealers, individuals, and other users with some or all of the lights de-activated at a lower cost than a fully functional quad light. The user can choose how many lights, light functions, and other configurations the user wishes to activate based on the user's needs and budget. This enables customization of each light or siren device to each user's specific needs while significantly reducing costs for user. The manufacturer can further produce and/or stock a single product rather than multiple different types of each device. This improves production efficiency and reduces costs to manufacturers and dealers that can produce and stock a single stock keeping unit (SKU).

The system operates in an unconventional manner by generating unlock codes and storing aggregated data for a plurality of lockable devices. In this manner, the computing device is used in an unconventional way and allows multi-function emergency vehicle devices to be sold with functions locked to decrease costs and enable stocking of single SKUs, while enabling users to customize functions on each device by unlocking functions on a function-by-function basis as each function is needed.

Referring again to FIG. 1, an exemplary block diagram illustrates a system 100 for remote management of lockable devices associated with emergency vehicles. A lockable device 102 in the plurality of lockable devices 104 is a device having one or more lockable functions, such as a multicolor lightbar or siren device. The lockable device 102, in this non-limiting examples, is configured for installation on an emergency vehicle.

The lockable device includes one or more available function(s) 106 which are locked, such that the function does not operate until it is unlocked via an unlock code 108. In this example, the lockable device function is placed into the locked state at the time of manufacture (production).

For example, if the lockable device 102 is a quad color light having a set of red lights, a set of blue lights, a set of white lights and a set of amber lights, the device function(s) associated with activating these lights are locked prior to shipping or otherwise releasing the light device to a dealer or end-user. In some examples, while the quad color light functions are in the locked state, none of the lights are capable of activating.

In other examples, a single color is enabled at manufacture/production time, but the other three colors are locked rending them unusable by the dealer or individual customer (end-user) until one or more of the light colors/functions are unlocked using one or more unlock codes. For example, a quad color lightbar may have a single red color light enabled, but the white lights, blue lights and amber lights disabled (locked) when released to the dealer or end-user. In this manner, the quad light can function as a single-color light. If the user pays a license 110 fee for a bi-color "red and blue" light, the system generates an unlock code to enable the blue lights to operate normally, as well as the red lights which were already activated. In some non-limiting examples, the bi-color lights remain operational for the time-period 112 specified in the license 110 agreement. In other examples, the bi-color lights remain operational until the one or more functions are re-locked. In other words, some functions may be unlocked for a specified time period while other functions may not be time-limited.

In another example, a single-color white light is enabled at manufacture while the other three colors are locked. If the user licenses the tri-color functionality, the system provides an unlock code to enable three of the four lights to operate. In still another example, the user can license all four colors to enable normal functioning of all the lights within the quad color light device.

In still other examples, the multicolor light device includes two levels of operation. The first level of operation is a single-color option. The second level of operation which may be unlocked by the user is the quad color option enabling operation of all four of the available light colors. However, the examples are not limited to these two levels. In other examples, a level may be provided for bi-color and another (fourth) level may be provided for tri-color options.

When a user receives a multicolor light device or siren device in a locked state, the user connects the lockable device 102 to a user device 114 to complete a licensing process to unlock one or more functions of the lockable device 102. The user device 114 represents any device executing computer-executable instructions 116. The user device 114 can be implemented as a mobile computing device, such as, but not limited to, a wearable computing device, a mobile telephone, laptop, tablet, computing pad, netbook, gaming device, and/or any other portable device. The user device 114 can also include less-portable devices such as servers, desktop personal computers, kiosks, or tabletop devices. Additionally, the user device 114 can represent a group of processing units or other computing devices.

In some examples, the user device 114 has at least one processor 118 and a memory 120. The user device 114, in other examples, includes a user interface 122 for displaying lockable device function status data.

In other examples, the user interface 122 component includes a graphics card for displaying data to the user and receiving data from the user. The user interface 122 can also include computer-executable instructions (e.g., a driver) for operating the graphics card. Further, the user interface 122 can include a display (e.g., a touch screen display or natural user interface) and/or computer-executable instructions (e.g., a driver) for operating the display. In other examples, the display can optionally include a virtual reality (VR) display, a mixed reality (MR) display and/or an augmented reality (AR) display.

The user interface 122 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the user device 114 in one or more ways.

In other non-limiting examples, the memory 120 stores applications, such as, but not limited to, a device management application 124 downloaded from a remote device management server 126 via a network 129. The device management application 124 enables the user to create configuration data 128 specifying one or more parameters 130 for licensing one or more available functions of a lockable device. For example, the parameter(s) 130 of the configuration data 128 can specify the number of lights to be activated in a quad light device, the combination of lights to shine or flash during activation, a flash pattern in which the lights should flash, the speed/rate of flash, etc. The device management application 124 transmits the configuration data 128 to the remote device management server 126.

The remote device management server 126, in some examples, represents any device executing computer-executable instructions 132 (e.g., as application programs, operating system functionality, or both) to implement the operations and functionality associated with the remote device management server 126. The remote device management server 126, in other examples, includes a mobile computing device or any other portable device. A mobile computing device includes, for example but without limitation, a mobile telephone, laptop, tablet, computing pad, netbook, gaming device, and/or portable media player. The remote device management server 126 can also include less-portable devices such as servers, desktop personal computers, kiosks, or tabletop devices. Additionally, the remote device management server 126 can represent a group of processing units or other computing devices.

In some examples, the remote device management server 126 has at least one processor 134 and a memory 136. The remote device management server 126, in other examples, optionally includes a user interface component.

The processor 134 includes any quantity of processing units and is programmed to execute the computer-executable instructions 132. The computer-executable instructions 132 is performed by the processor 134, performed by multiple processors within the remote device management server 126 or performed by a processor external to the remote device management server 126. In some examples, the processor 134 is programmed to execute instructions such as those illustrated in the figures (e.g., FIG. 16, FIG. 17, FIG. 18, FIG. 19, and FIG. 20).

The remote device management server 126 further has one or more computer-readable media such as the memory 136. The memory 136 includes any quantity of media associated with or accessible by the remote device management server 126. The memory 136, in these examples, is internal to the remote device management server 126 (as shown in FIG. 1). In other examples, the memory 136 is external to the computing device (not shown) or both (not shown).

The memory 136 stores data, such as one or more applications. The applications, when executed by the processor 134, operate to perform functionality on the remote device management server 126. The applications can communicate with counterpart applications or services such as web services accessible via a network 129. In an example, the applications represent downloaded client-side applications that correspond to server-side services executing in a cloud.

The network 129 is implemented by one or more physical network components, such as, but without limitation, routers, switches, network interface cards (NICs), and other network devices. The network 129 is any type of network for enabling communications with remote computing devices, such as, but not limited to, a local area network (LAN), a subnet, a wide area network (WAN), a wireless (Wi-Fi) network, or any other type of network. In this example, the network 129 is a WAN, such as the Internet. However, in other examples, the network 129 is a local or private LAN.

In some examples, the remote device management server 126 includes a communications interface device 138. The communications interface device 138 includes a network interface card and/or computer-executable instructions (e.g., a driver) for operating the network interface card. Communication between the remote device management server 126 and other devices, such as but not limited to the user device 114 and/or a cloud storage 140, can occur using any protocol or mechanism over any wired or wireless connection. In some examples, the communications interface device 138 is operable with short range communication technologies such as by using near-field communication (NFC) tags.

The cloud storage 140, in this non-limiting example, is a cloud-based data store storing aggregated data 142. The aggregated data 142 is function-related data 146 describing licensed and unlicensed (locked and unlocked) functions on the plurality of lockable devices 104. The cloud storage 140 provides remote data storage services to the device 138 or other clients, such as, but not limited to, the user device 114. The cloud storage 140 is hosted and/or delivered via the network 129. In some non-limiting examples, the cloud storage 140 is associated with one or more physical data storage devices in one or more data centers. In other examples, the cloud storage 140 is associated with a distributed network of data storage devices.

The remote device management server 126 can optionally include a data storage device 144 for storing data, such as, but not limited to the function-related data 146. In other examples, the data storage device 144 can also store aggregated data 142, unlock codes, configuration data 128, license 110 data, as well as any other lockable device related data.

In some examples, the data storage device 144 can include one or more different types of data storage devices, such as, for example, one or more rotating disks drives, one or more solid state drives (SSDs), and/or any other type of data storage device. The data storage device 144 in some non-limiting examples includes a redundant array of independent disks (RAID) array. In other examples, the data storage device 144 includes a database.

The data storage device 144, in this example, is included within the remote device management server 126, attached to the remote device management server 126, plugged into the remote device management server 126, or otherwise associated with the remote device management server 126. In other examples, the data storage device 144 includes a remote data storage accessed by the remote device management server 126 or any other computing device via the network 129, such as a remote data storage device, a data storage in a remote data center, or the cloud storage.

The memory 120, in some examples, stores one or more computer-executable components. Exemplary components include a remote device manager 148, when executed by the processor 134 of the remote device management server 126, generates an unlock code corresponding to configuration data 128 received from the user device 114 for unlocking at least one available function 106 on a selected lockable device 102. The unlock code 108 is a unique per-device code that enables operation of the at least one available function for a predetermined time-period in response to the selected lockable device receiving the unlock code. In other words, the unlock code is a unique code for a specific lockable device and a specific function to be unlocked. The remote device manager 148 transmits the unlock code to the user device 114. The user device 114 provides the unlock code 108 to the lockable device 102 via the wired or wireless connection between the user device 114 and the lockable device 102. The unlock code unlocks the selected function(s) to enable operation of the selected function(s).

The unlock code, in some examples, enables operation of the function(s) for a predetermined time-period during which the license is effective. In other examples, the unlock code enables operation of the selected function(s) indefinitely or until the function(s) are re-locked.

In some examples, the selected function(s) are specified in the configuration data in accordance with at least one parameter specified in the configuration data. A parameter is a rule, definition or specification describing, limiting, or otherwise defining a function of the lockable device. A parameter can detail a length of time a license (unlock) is effective, warranty details, license fees, etc. A parameter can also specify function options selected by a user. For example, if a user chooses to unlock all four light colors in a quad color light device, the user can select which color combinations should light up together in response to a user activating one or more controls. A parameter can specify that a siren device emit a standard wailing siren sound activated in normal mode when an "emergency" control switch is activated while the vehicle is in motion but go silent when the emergency vehicle is placed in park.

In other examples, the remote device manager 148 stores aggregated data 142 associated with the plurality of locked devices in the data storage device 144 and/or cloud storage 140. The remote device manager 148 updates a lock status 150 of the selected lockable device to indicate a change from a locked state to an unlocked state of the at least one available function. The aggregated data storage device 144 stores function-related data 146 associated with one or more available functions of the plurality of lockable devices. The function-related data 146 includes the lock status 150 of the at least one available function of the selected lockable device.

Figure 2:
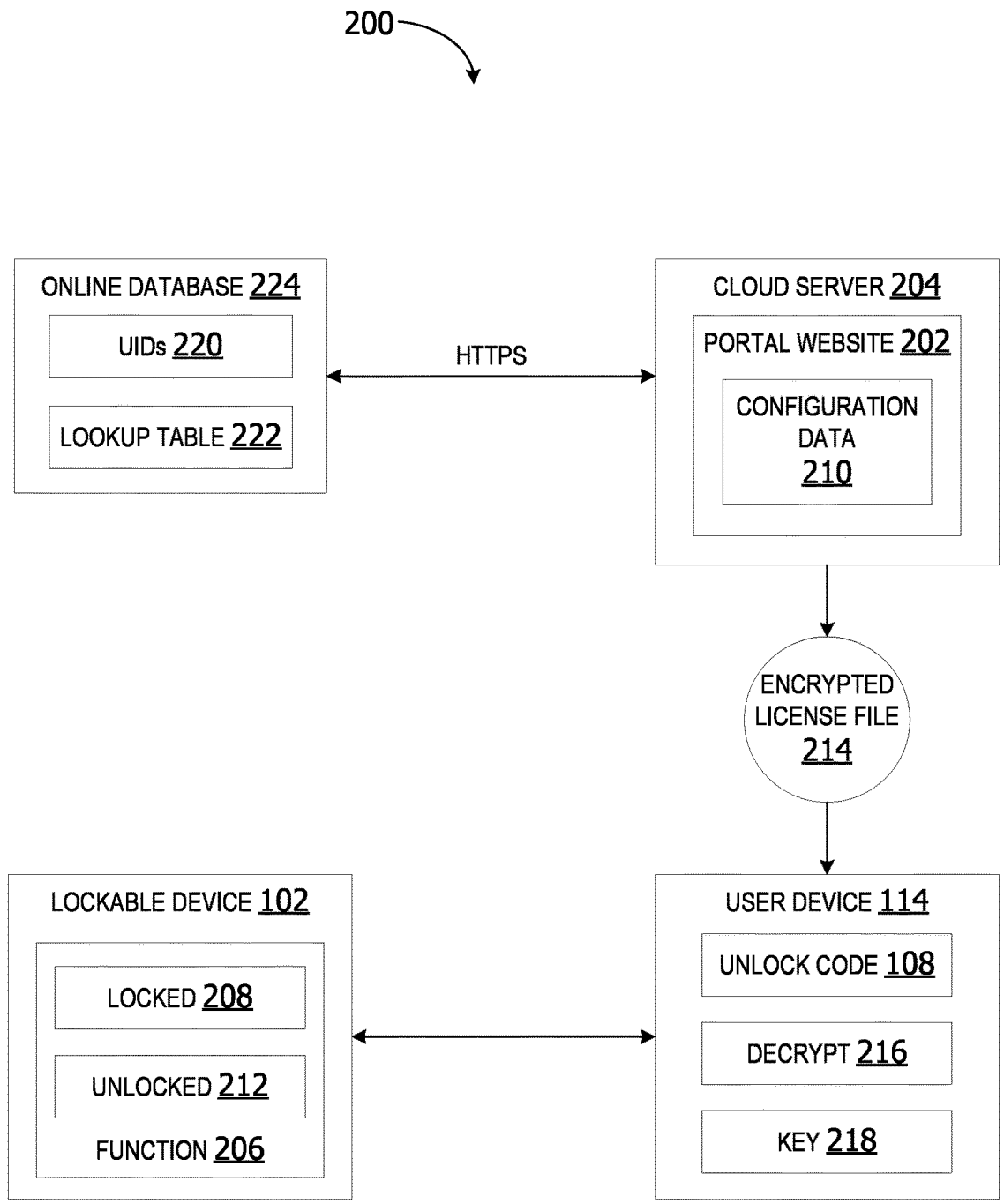
FIG. 2 is an exemplary block diagram illustrating a system for unlocking locked functions on a lockable device via a portal website.

Turning now to FIG. 2, an exemplary block diagram illustrating a system 200 for unlocking locked functions on a lockable device 102 via a portal website 202 hosted on a cloud server 204 is depicted. In this non-limiting example, the user device 114 connects to the lockable device 102. The connection may be a wireless or wired connection. In this example, the lockable device 102 is connected to the user device 114 via a universal serial bus (USB) port on the lockable device 102 and/or the user device 114. At least one function 206 is in a locked 208 state in which the function 206 is disabled. The user utilizes the user device 114 to access the portal website 202, which is presented to the user on a user interface, such as, but not limited to, the user interface 122 in FIG. 1. The portal website sends a portal page to the user device. The user interacts with the portal page to generate configuration data 210 specifying one or more functions to be unlocked 212. The configuration data is data describing a set of user preferences/selection with regard to one or more functions on the lockable device to be licensed (unlocked).

In some examples, the cloud server 204 utilizes the configuration data 210 to generate an encrypted license file 214. The license file is encrypted in some examples using cryptographic keys, such as, but not limited to, a public key and private key. For example, the cloud server 204 encrypts the license file using a public key. The user device 114 uses a private cryptographic key 218 corresponding to the public key to decrypt 216 the file to obtain the unlock code 108. The unlock code 108 is used by the user device 114 (sent to lockable device 102) to unlock the locked function 206.

In other examples, the configuration data 210 includes a UID 220 assigned to the lockable device 102. The UID is generated by the remote device manager and assigned to the lockable device. Each lockable device is assigned a different UID. The remote device manager uses the UID to locate function-related data associated with the lockable device 102 in a lookup table 222. In this example, the lookup table is stored in an online database 224, such as, but not limited to, a database on the cloud server or a cloud storage. In other examples, the lookup table 222 is stored on a data storage device accessible by the cloud server 204, such as, but not limited to, the data storage device 144.

In this example, the remote device manager is hosted on the cloud server. In other examples, the remote device manager is hosted on a physical computing device, such as, but not limited to, the remote device management server 126.

In some examples, a host website generates a license file. The user downloads it or generates it on the user computing device. The user device sends a request, including a UID, such as a serial number, on a hypertext protocol (HTTP) call to a database that stores UID serial numbers for each lockable device. Each product/light bar has a unique serial number (UID). Unique serial numbers generated at the server. Every product is warranty dated to identify the date of manufacture. The UID is stored in a database and programmed to each lockable device product. The lockable device is shipped to the dealer or customer.

In another example, the portal website generates license files sent to the user devices. The user device sends license information to the portal website. The portal website replies and sends configuration data back to website with the level of unlock.

In other examples, the license file is encrypted by the server and decrypted by the client (user device). The encryption, in one example, is advanced encryption standard (AES) 256 or RSA asymmetric or symmetric encryption using public key and private key encryption. In one example, the private key is known only to the lockable device product and used to decrypt the license file to obtain the unlock code.

In other examples, the lockable device includes a receive device (RX) and a transmit device (TX). The lockable device connection point in another example utilizes RS45 protocols to USB. A network call can be performed wirelessly connects to the user device via Wi-Fi, near field communication (NFC), Bluetooth®, ultrawide band (UWB), or any other type of wireless communication using transistor-transistor logic (TTL) or secure socket layer (SSL) for encrypted communication.

Figure 3:
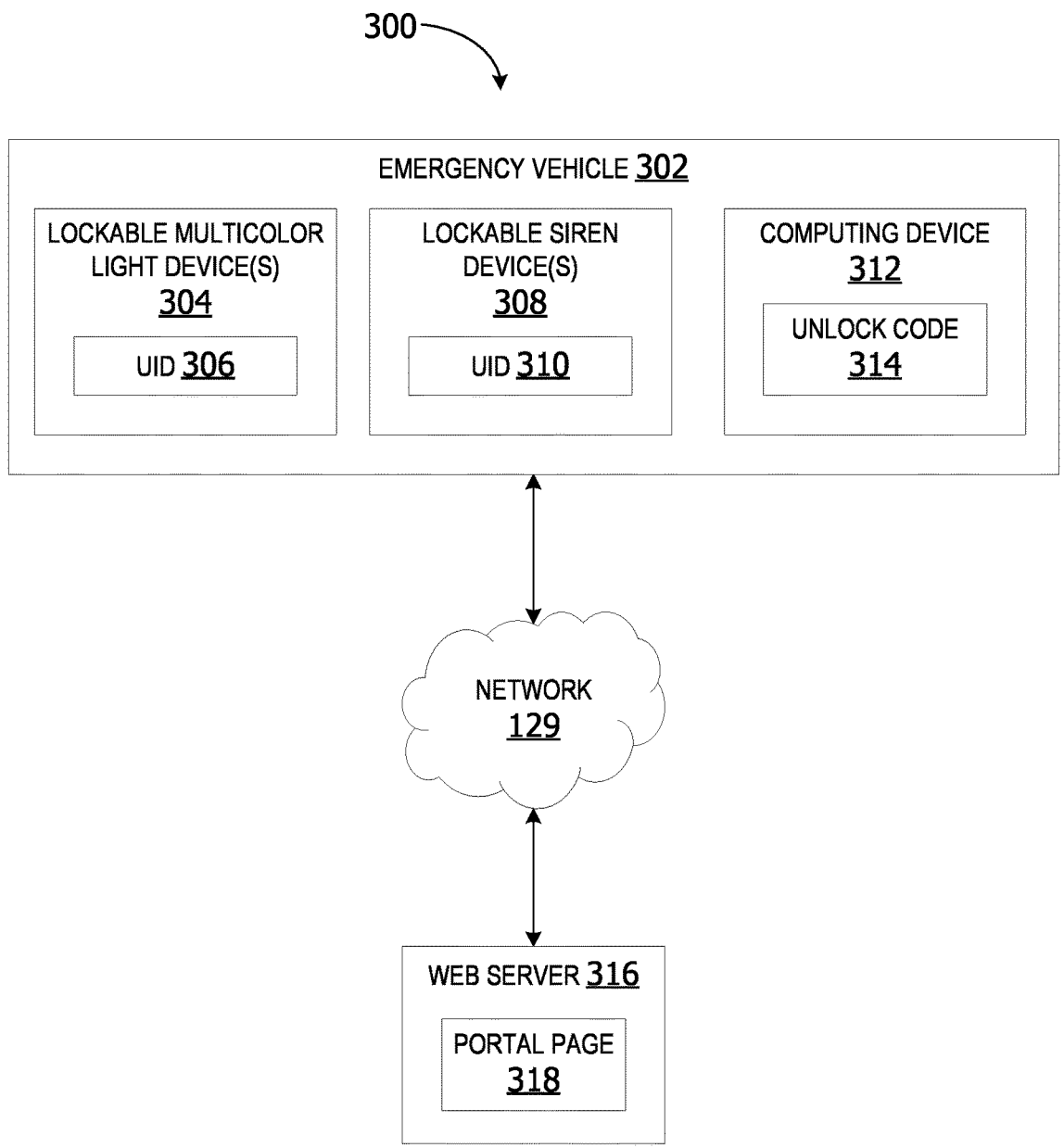
FIG. 3 is an exemplary block diagram illustrating a system for unlocking one or more functions on one or more lockable devices installed on an emergency vehicle.

Referring now to FIG. 3, an exemplary block diagram illustrating a system 300 for unlocking one or more functions on one or more lockable devices installed on an emergency vehicle 302 is shown. The emergency vehicle 302 is implemented as any type of emergency vehicle, such as, but not limited to, a police car, police truck, ambulance, tow truck, fire truck, search and rescue vehicle, police motorcycle, etc.

The emergency vehicle 302, in this non-limiting example, includes one or more lockable device installed on the emergency vehicle 302. In some examples, the emergency vehicle 302 includes one or more lockable multicolor light device(s) 304, such as, but not limited to, a lightbar device having two or more colored lights. In this example, the lockable multicolor light device(s) 304 is a quad lightbar. The lockable multicolor light device is assigned a UID 306.

In other examples, the emergency vehicle 302 includes one or more lockable siren device(s) 308. A siren device is a device for emitting an audible siren sound. A UID is assigned to each lockable siren device.

The emergency vehicle 302 includes an onboard computing device 312. The onboard computing device includes a processor and memory. The computing device receives an unlock code 314 to unlock one or more functions on the lockable multicolor light device or the lockable siren device from the web server 316 via the network 129. A unique unlock code is required for the lockable multicolor light device and a different unlock code is required to unlock function(s) on the lockable siren device.

In this example, the web server 316 is a computing device or cloud server for hosting a web page or portal page 318, such as, but not limited to, the remote device management server 126 in FIG. 1 and/or the cloud server 204 in FIG. 2. In this manner, the user can utilize the computing device connected to the lockable device to unlock one or more functions of the lockable devices without detaching the lockable device from the emergency vehicle. However, the examples are not limited to connecting the lockable device(s) to a computing device while installed on an emergency vehicle. In other examples, a lockable device is attached to a user device or other computing device before the lockable device is installed on an emergency vehicle 302 and/or the lockable device is uninstalled from the emergency vehicle when the user wants to unlock additional functions.

Figure 4:
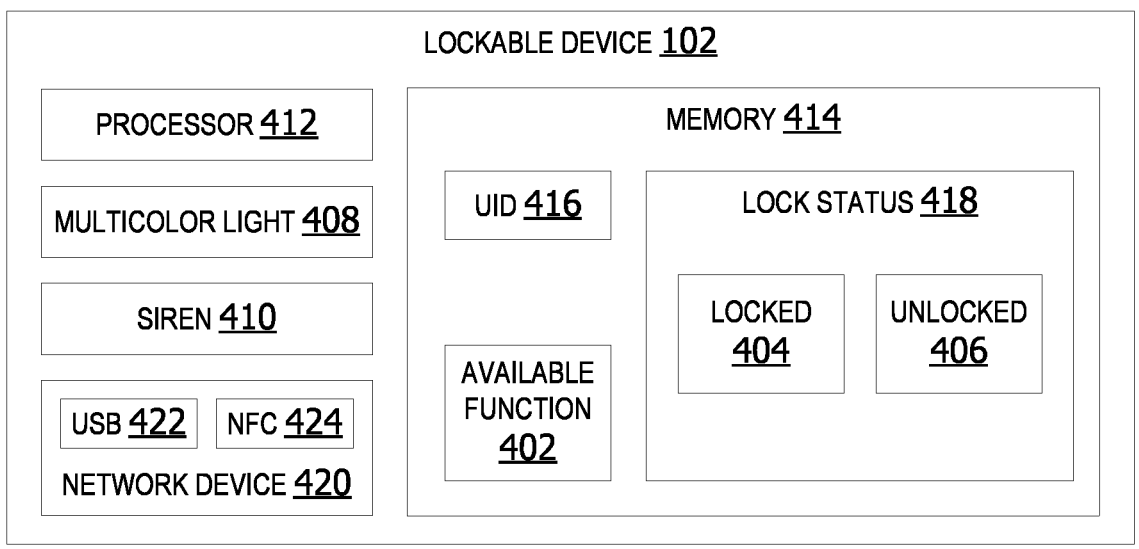
FIG. 4 is an exemplary block diagram illustrating a lockable device including at least one available function capable of being locked or unlocked.

FIG. 4 is an exemplary block diagram illustrating a lockable device 102 including at least one available function 402 capable of being locked 404 or unlocked 406. In this non-limiting example, the lockable device 102 is a multicolor light 408 or a siren 410 device. However, in other examples, the lockable device is implemented as any type of device on an emergency vehicle capable of having one or more functions locked or unlocked.

The lockable device 102 includes a processor 412 and a memory 414 storing a UID 416 and/or a lock status 418 of the available function 402. The lockable device 102 also includes a network device 420 enabling the lockable device to communicatively couple to a computing device, such as, but not limited, the user device 114 in FIG. 1. In some examples, the lockable device connects to the user device via a wired network connection, such as, but not limited to, ethernet or a USB 422 port. In other examples, the lockable device wirelessly connects to the user device via Wi-Fi, NFC, Bluetooth®, UWB, or any other type of wireless communication using TTL or SSL for encrypted communication.

Figure 5:
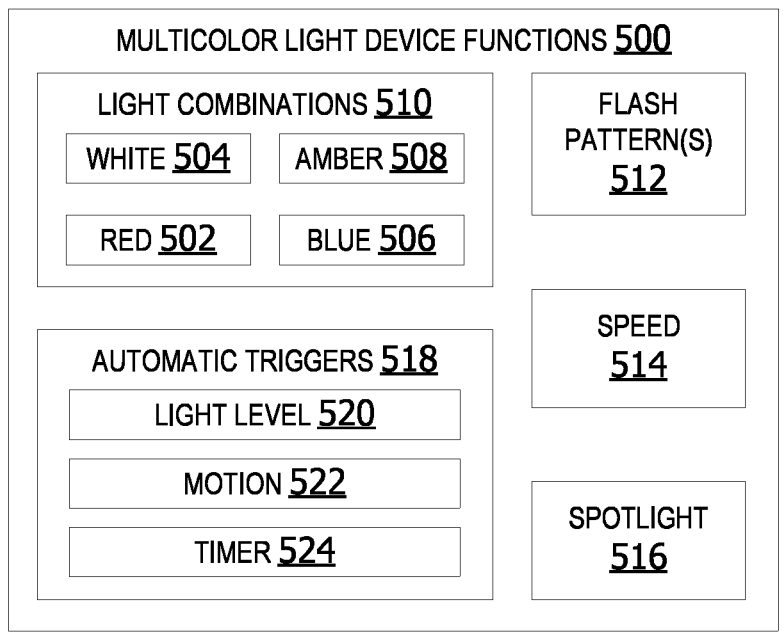
FIG. 5 is an exemplary block diagram illustrating multicolor light device functions.

FIG. 5 is an exemplary block diagram illustrating multicolor light device functions 500. A multicolor light device is a device having two or more colored lights, such as, but not limited to, a dual colored lightbar, a tri-color lightbar, a quad color lightbar or a lightbar having five or more different colored lights. In this example, the multicolor light device is a quad color light device having the colors red 502, white 504, blue 506 and amber 508. The multicolor light device is a light-emitting diode (LED) quad color light.

The light colors are lockable. Thus, the multicolor light device can be sold with all four light colors disabled such that the light device does not function as a light at all unless at least one light color is licensed. In other examples, the light device is sold or shipped to a dealer/customer as a single-color light device having three of the four colors locked and only a single color unlocked for use. In these examples, when a dealer or end user receives the light device, only a single color is operable. If the amber 508 is operable, the multicolor light device only functions to illuminate the amber lights while the red, blue, and white lights remain inoperable until the dealer or user chooses to unlock one or more of the lights or light combination 510.

A light combination 510 is a combination of two or more lights in the available light colors on the multicolor light device which are operable. In one example, a light combination 510 can include red and blue while the white and amber are inoperable. In this case, the light device functions as a dual color light capable of flashing red and blue lights in one or more flash pattern(s) 512.

In another example, a light combination 510 can include all four colored lights unlocked for use. In this example, there may be dozens of possible flash patterns available enabling the user to choose to flash a single-color light, two lights, three lights or all four lights in various possible flash patterns.

Other functions on a multicolor light device can include speed 514 of a flashing light. A light or combination of lights can flash on and off at different speeds. The speed 514 option enables a user to select one or more speeds of light flashing in one or more flash patterns for one or more lights in the possible light combinations.

A spotlight 516 function enables an LED light on the multicolor light device to shine a steady light in one or more directions like a spotlight. The automatic triggers 518 include one or more user-configurable triggers for automatically turning a light or combination of lights on or off. A light level 520 can trigger a light turning on or off. For example, a light can be programmed to turn on when ambient light levels fall below a minimum threshold level, such as, but not limited to, automatically turning on headlights at sunset. In another example, a light can be programmed to automatically turn off in response to a light level exceeding a threshold light level, such as, but not limited to, headlights turning off when exterior light levels make headlights unnecessary.

A motion sensor detecting motion 522 can trigger automatic activation or de-activation of one or more lights. For example, a light can be programmed to turn on if movement is detected near a vehicle or if a user comes into contact with the vehicle.

A timer 524 function can enable programming a light or combination of lights to activate (turn on) or de-activate (turn off). For example, a light can be programmed to automatically turn off after a pre-determined period of time or automatically turn on at a given time.

Figure 6:
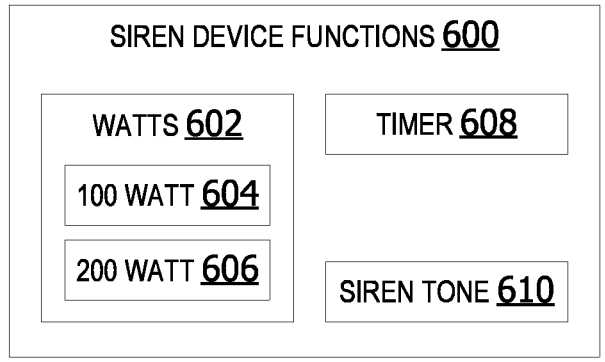
FIG. 6 is an exemplary block diagram illustrating siren device functions.

FIG. 6 is an exemplary block diagram illustrating siren device functions 600. The siren device functions can include a number of watts 602. For example, the siren device can operate as a 100-watt 604 siren device or a 200-watt 606 siren device. The siren device can include a timer 608 function and siren tone 610. A siren tone 610 refers to the diverse types of siren sounds having differences in pitch and progression. For example, a siren tone can include an airhorn, wail, yelp, piece, scan, warble, or any other type of siren sound.

Figure 7:
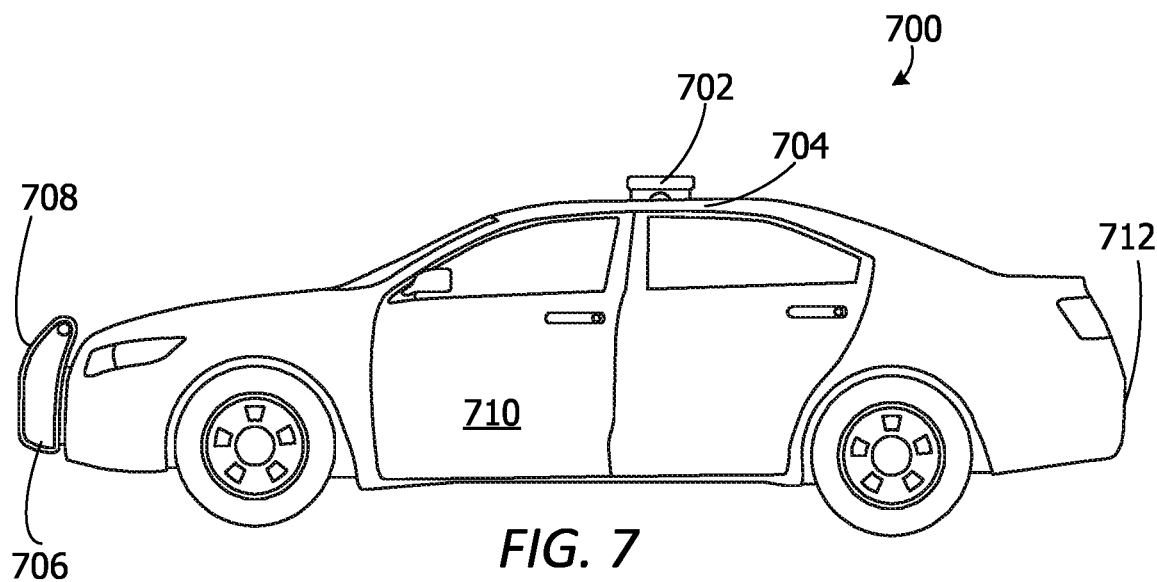
FIG. 7 is an exemplary block diagram illustrating an emergency vehicle sedan including at least one lockable device.

FIG. 7 is an exemplary block diagram illustrating an emergency vehicle sedan 700 including at least one lockable device. In this example, the lockable device is a multicolored lightbar installed on an exterior surface of a roof 704 of the vehicle. The vehicle sedan 700 can also include a siren device 706 mounted under the vehicle or proximal to a front grill 708 of the vehicle. In other examples, the vehicle sedan 700 can include a lightbar mounted to a front grill 708, a door 710, a rear bumper 712 or any other part of the vehicle.

Figure 8:
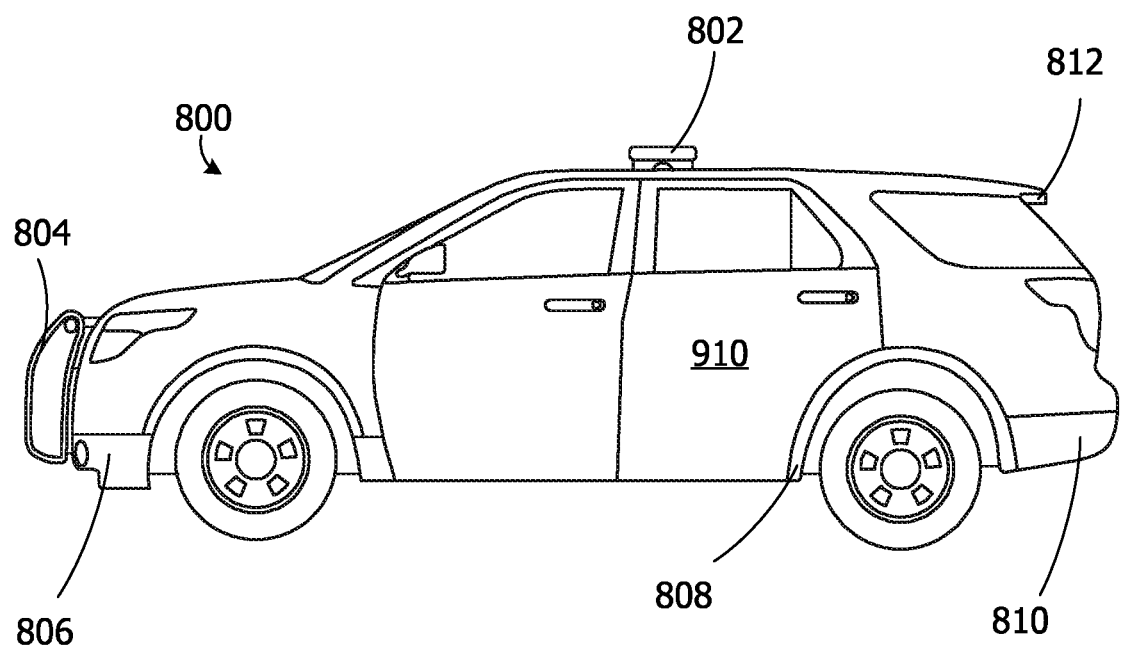
FIG. 8 is an exemplary block diagram illustrating an emergency vehicle sport utility vehicle (SUV) including at least one lockable device.

FIG. 8 is an exemplary block diagram illustrating an emergency vehicle sport utility vehicle (SUV) 800 including at least one lockable device. In this example, the lockable device is a multicolor LED lightbar 802 mounted to the roof of the vehicle 800. The vehicle, in this example, also includes a lockable siren device 804 mounted on the front grill or the underside of the vehicle. Other lockable devices on the vehicle 800 can include a multicolor LED light mounted to a front bumper 806, a wheel rim 808, a bumper 810 and/or a rear lightbar 812.

Figure 9:
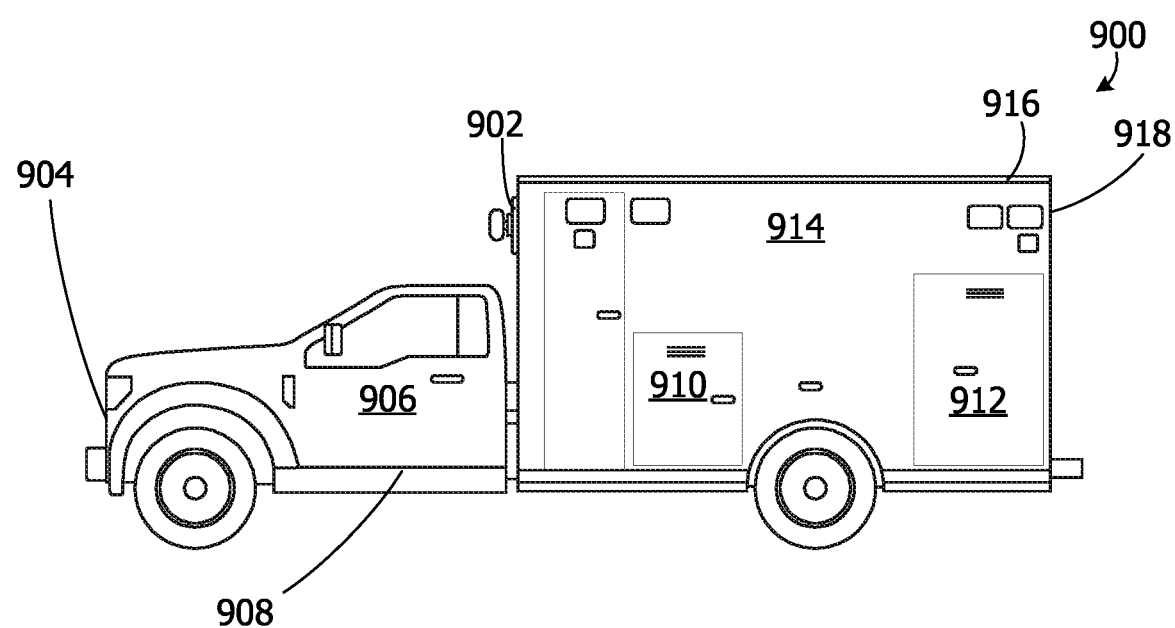
FIG. 9 is an exemplary block diagram illustrating an emergency vehicle truck 900 including at least one lockable device.

FIG. 9 is an exemplary block diagram illustrating an emergency vehicle truck 900 including at least one lockable device. In this example, the truck includes a multicolor lightbar 902 having one or more functions which can be locked at manufacture and unlocked by a user by obtaining an unlock code. A siren device 904 is a lockable device which has a lockable 200-watt functionality.

The vehicle can optionally also include one or more additional lockable multicolor light devices mounted on an interior or exterior of the truck. For example, a lockable multicolor light device can be mounted to locations such as, but not limited to, a running board 908, compartment door 910 and 912, side 914, roof 916, back 918 and/or any other portion of the vehicle truck 900.

Figure 10:
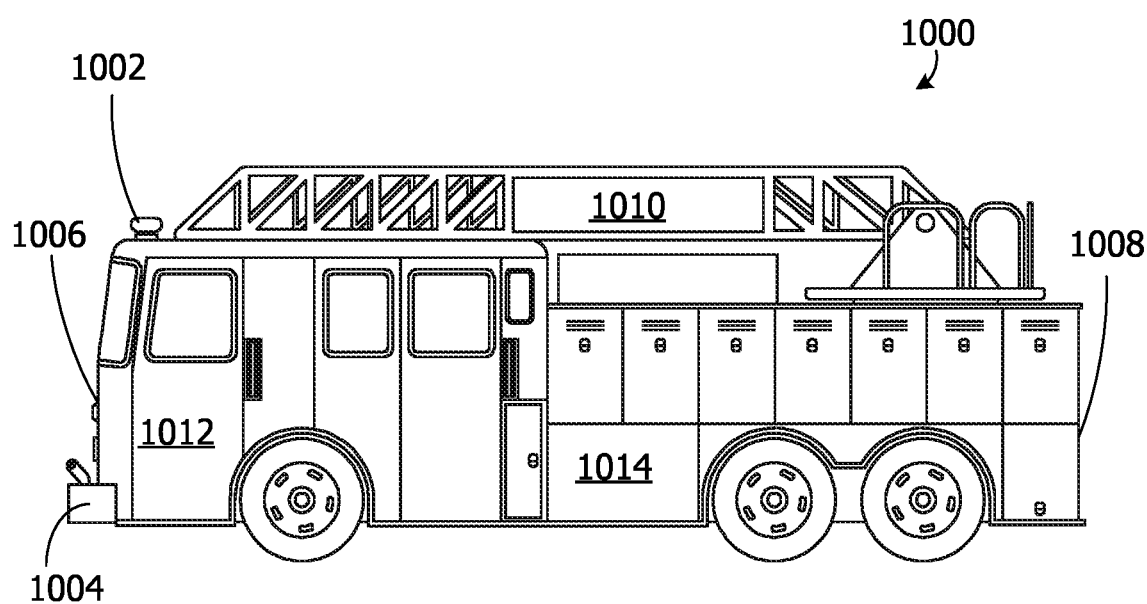
FIG. 10 is an exemplary block diagram illustrating an emergency vehicle firetruck including at least one lockable device.

FIG. 10 is an exemplary block diagram illustrating an emergency vehicle firetruck 1000 including at least one lockable device. In this example, a lockable multicolor LED lightbar 1002 is mounted to a roof of a firetruck cab. A siren device can be mounted to a roof, front bumper 1004 or front grill 1006 of the firetruck. Multicolor LED lights can also be mounted on the side 1014, back 1008, ladder 1010 and/or door 1012 of the firetruck 1000. The examples are not limited to mounting a siren to the grill or underside of the vehicle. The siren device can be mounted to any portion of an exterior or interior of the vehicle.

Figure 11:
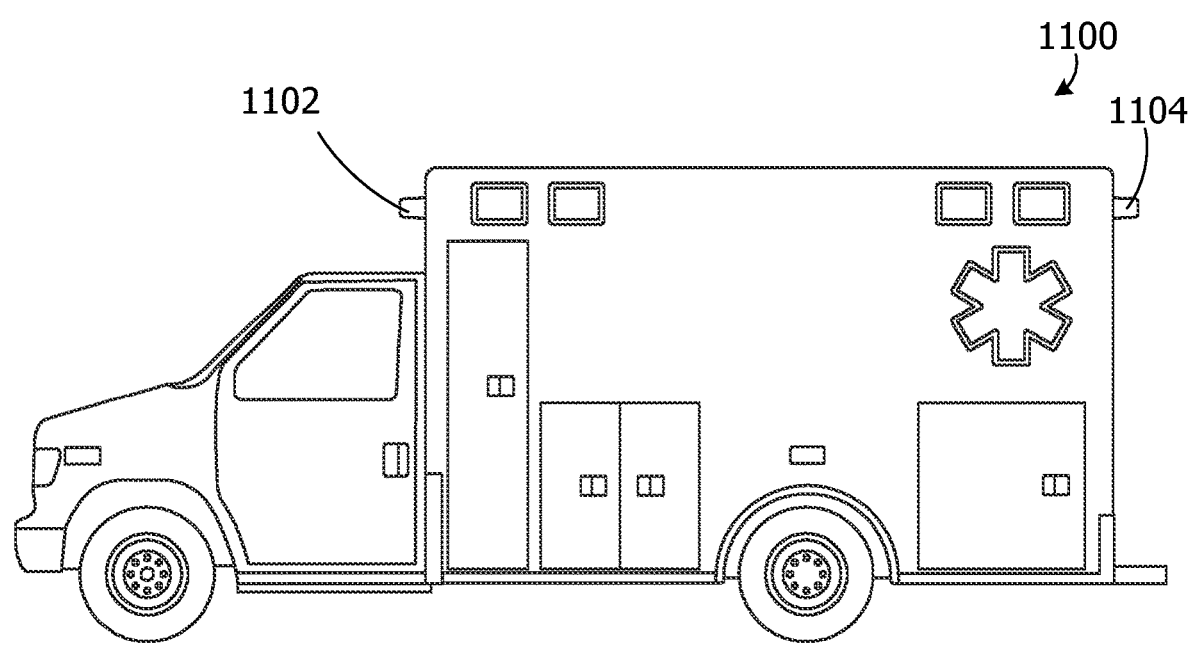
FIG. 11 is an exemplary block diagram illustrating an emergency vehicle ambulance including at least one lockable device.

FIG. 11 is an exemplary block diagram illustrating an emergency vehicle ambulance 1100 including at least one lockable device. In this example, a lockable multicolor LED lightbar 1102 is mounted to a front portion of the ambulance above the cab and another multicolor LED lightbar 1104 is mounted to a back portion of the ambulance. In other examples, the lockable devices can include one or more siren devices as well as one or more additional lockable multicolor light devices.

Figure 12:
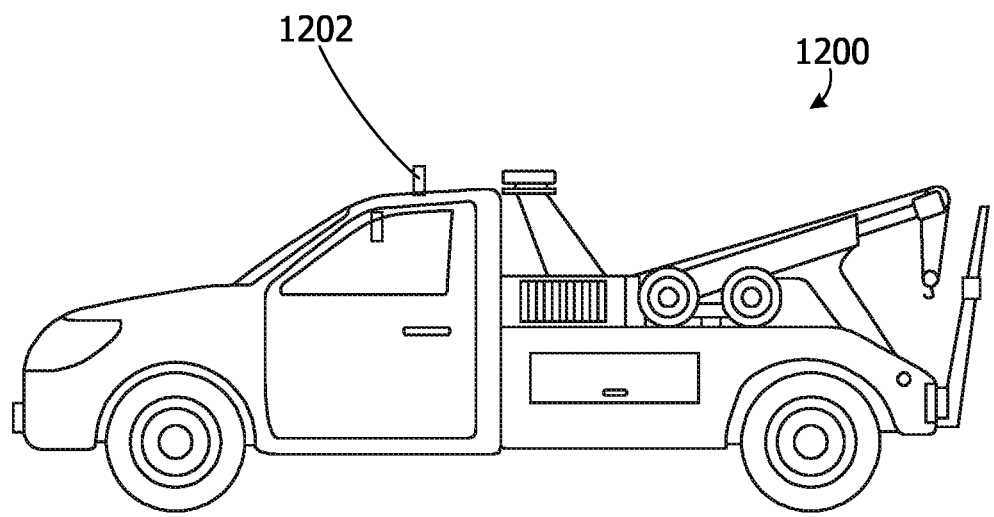
FIG. 12 is an exemplary block diagram illustrating an emergency vehicle tow truck including at least one lockable device.

FIG. 12 is an exemplary block diagram illustrating an emergency vehicle tow truck 1200 including at least one lockable device. The tow truck includes a lockable multicolor lightbar 1202 mounted to the exterior surface of the roof of the tow truck. In other examples, the tow truck can include one or more siren devices and/or one or more lockable multicolor light devices mounted to one or more portions of the tow truck.

Figure 13:
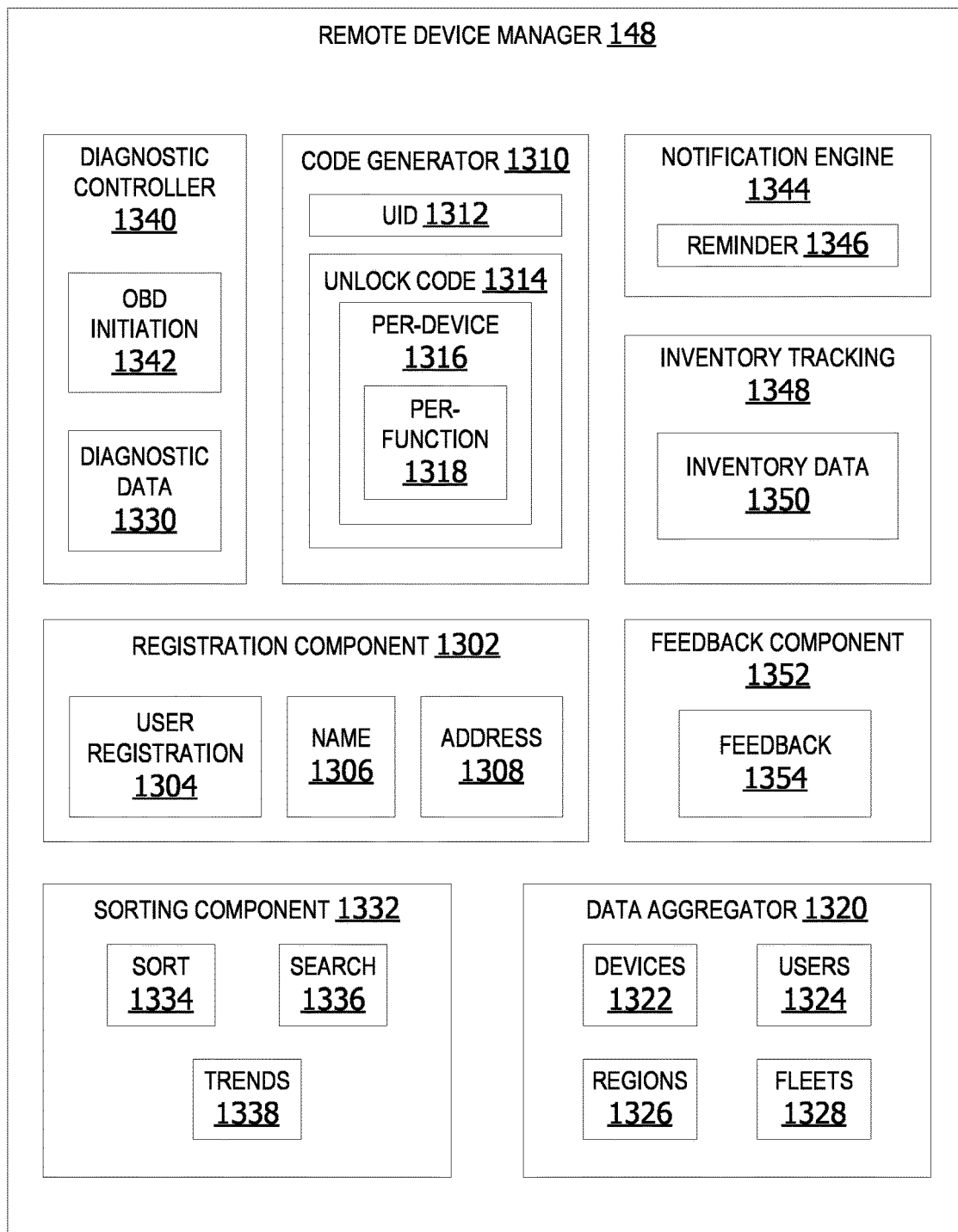
FIG. 13 is an exemplary block diagram illustrating a remote device manager for generating an unlock codes.

FIG. 13 is an exemplary block diagram illustrating a remote device manager 148 for generating an unlock codes. In some examples, the remote device manager 148 includes a registration component 1302 that manages user registration 1304. The registration component 1302, in one example, obtains a username 1306, address 1308 and other user registration data to set up a license account to license one or more locked functions of a lockable device.

A code generator 1310 is a software component that generates a UID 1312 for each lockable device. Every lockable device receives a unique identifier, such as, but not limited to, a unique serial number or other UID. In other examples, the code generator 1310 generates a unique per-device 1316 and per-function 1318 unlock code 1314. The remote device manager 148 sends the unlock code 1314 to the user device requesting the unlock code.

In other examples, a data aggregator 1320 aggregates device-related data and function-related data obtained from a plurality of lockable devices. The plurality of lockable devices can include devices installed on vehicles as well as uninstalled devices in inventory which have not yet been installed on vehicles. The function-related data indicates which functions are locked and which functions are unlocked. The device-related data includes device diagnostic data 1330, maintenance data, installation date, purchase date, ship date, manufacture date, batch data, etc. The aggregated data includes data obtained from a plurality of lockable devices 1322 associated with a plurality of different users 1324, different regions 1326 and/or different fleets 1328 of vehicles.

A sorting component 1332 is a software component, in some examples, that can sort 1334 and/or search 1336 aggregated data to identify trends 1338. The trends in the data can include common maintenance issues in devices manufactured on the same date or devices operating in the same region. In another example, the trends can be used to improve quality of devices, recommend maintenance, identify popular features, predict future function licensing trends, etc.

In some examples, the sorting component 1332 searches aggregated data to identify popular/favorite functions (most licensed functions) and/or least licensed functions. The sorting component 1332 in other examples searches aggregated data for current licensed features in a given regions, functions licensed by a given dealer/customer, functions licensed by type of device, functions licensed by category of device, etc. Thus, licensed functions can be sorted on a per-device basis, based on type of device, category device or any other criteria.

In other examples, the sorting component 1332 searches the aggregated data for common maintenance issues across a plurality of locked devices within a given region, purchased by a given dealer/customer, and/or within given categories and types of devices. In still other examples, the sorting component 1332 identifies maintenance issues and/or commonalities among devices manufactured/produced on the same date or within a given time-period. The sorting component 1332 in still other examples identifies percentage of licensed functions by dealer, individual, fleet of vehicles, organization and/or region. A region can include an area within a city, county, state, country, or any other geographical area.

In yet other examples, the sorting component 1332 analyzes the aggregated data to identify functions licensed within a given region, or during a given time-period. The aggregated data can also be sorted based on functions licensed on the type of emergency department, such as, police department, fire department, etc.

Data in other examples is sorted based on functions licensed on devices by type of vehicle, such as, but not limited to, percentages of features licensed for police vehicles versus ambulances. The system in still other examples searches and sort data to identify common issues across time, devices, regions, manufacture dates, or any other criteria. In another example, data is sorted to identify percentage of license renewals versus license lapse data across types of vehicles, types of devices, fleets, regions, or any other user-selected criteria.

The remote device manager 148, in some examples, includes a diagnostic controller 1340. The diagnostic controller 1340 performs on-board diagnostics (OBD) initiation 1342 to trigger a diagnostic test or diagnostic process to generate diagnostic data 1330 associated with a lockable device plugged into a user device which is logged into the server hosting the remote device manager 148. The diagnostic data is optionally stored with the aggregated data in a local data storage device or a cloud storage. Optionally the OBD can trigger lights and sirens to activate or flash.

A notification engine 1344 in other examples sends a reminder 1346 to the user device when a maintenance task associated with a registered lockable device is due or will be due within a predetermined time period. In other examples, the reminder 1346 is a reminder to renew a warranty associated with a registered lockable device. In still other examples, the notification engine generates a license renewal notification when a license of a lockable function is approaching the expiration date (expiry) of the license term. The reminder can include a link enabling the user to connect to the portal webpage to renew the license and/or change a set of configurations in the configuration data to unlock additional features on the registered lockable device.

In other examples, an inventory tracking 1348 is a software component that tracks lockable devices in inventory which have not yet been installed on a vehicle. The inventory data 1350 can include devices which have been installed and/or devices currently in service on one or more vehicles.

In still other examples, a feedback component 1352 obtains feedback 1354 from one or more users regarding one or more functions licensed by the user(s). The feedback 1354 in this example is used to improve customer satisfaction, identify functions to eliminate, identify new functions to add and otherwise ensure production quality.

Figure 14:
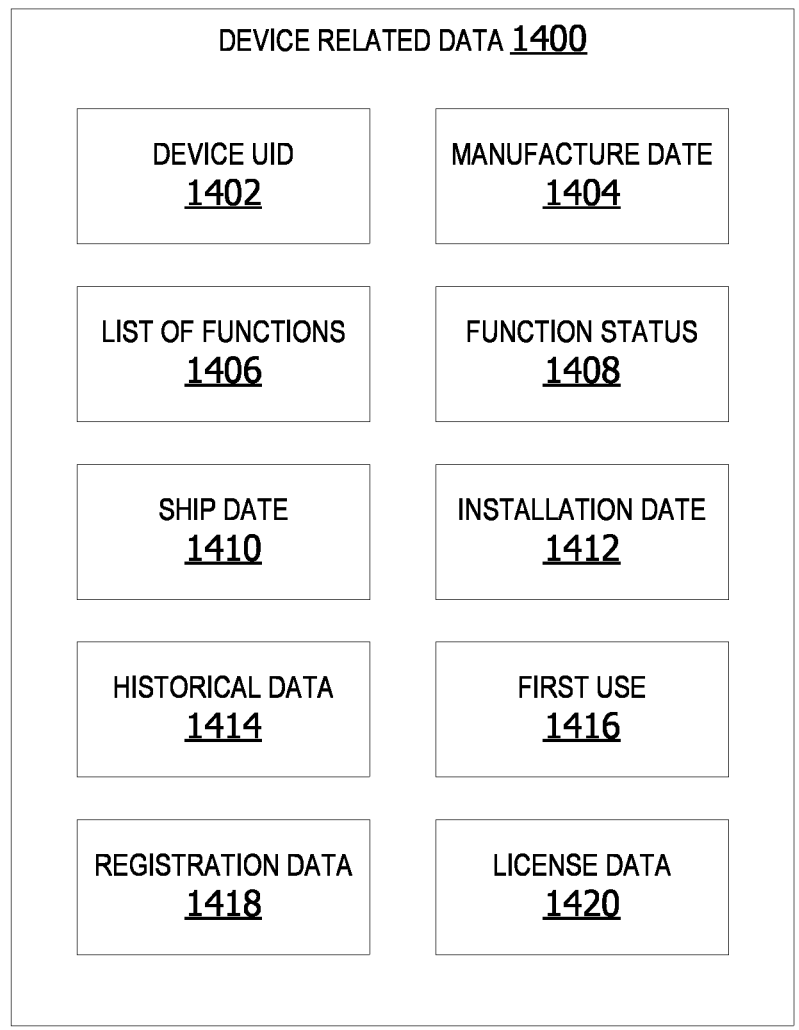
FIG. 14 is an exemplary block diagram illustrating device related data.

FIG. 14 is an exemplary block diagram illustrating device related data 1400. The device related data is data associated with a lockable device. The device related data can include device UID 1402 assigned to the device. Manufacture date 1404 is a date on which the device was produced or manufactured.

The aggregated data can also include a list of available functions 1406 for each registered device, both locked functions as well as unlocked functions. The list of functions 1406 can include a function status 1408 for each function. The function status indicates whether a given function is locked or unlocked. A registered device is a lockable device which has been registered by a user and/or a device on which at least one function has been unlocked. An unregistered lockable device is a device in manufacturer inventory or dealer inventory which has not yet been installed on a vehicle, registered by an end-user and/or licensed additional functions beyond basic functions which are unlocked at manufacture time.

The device related data can further include a ship date 1410 on which the device was shipped to a dealer or other purchaser, installation date 1412 on which the device was installed on a vehicle, first use 1416 indicating the date on which the device was first activated or put into service, as well as other historical data 1414fi.

Registration data 1418 and/or license data 1420 is optionally also included in the device related data 1400. The device related data is stored with aggregated function-related data in the aggregated data store.

Figure 15:
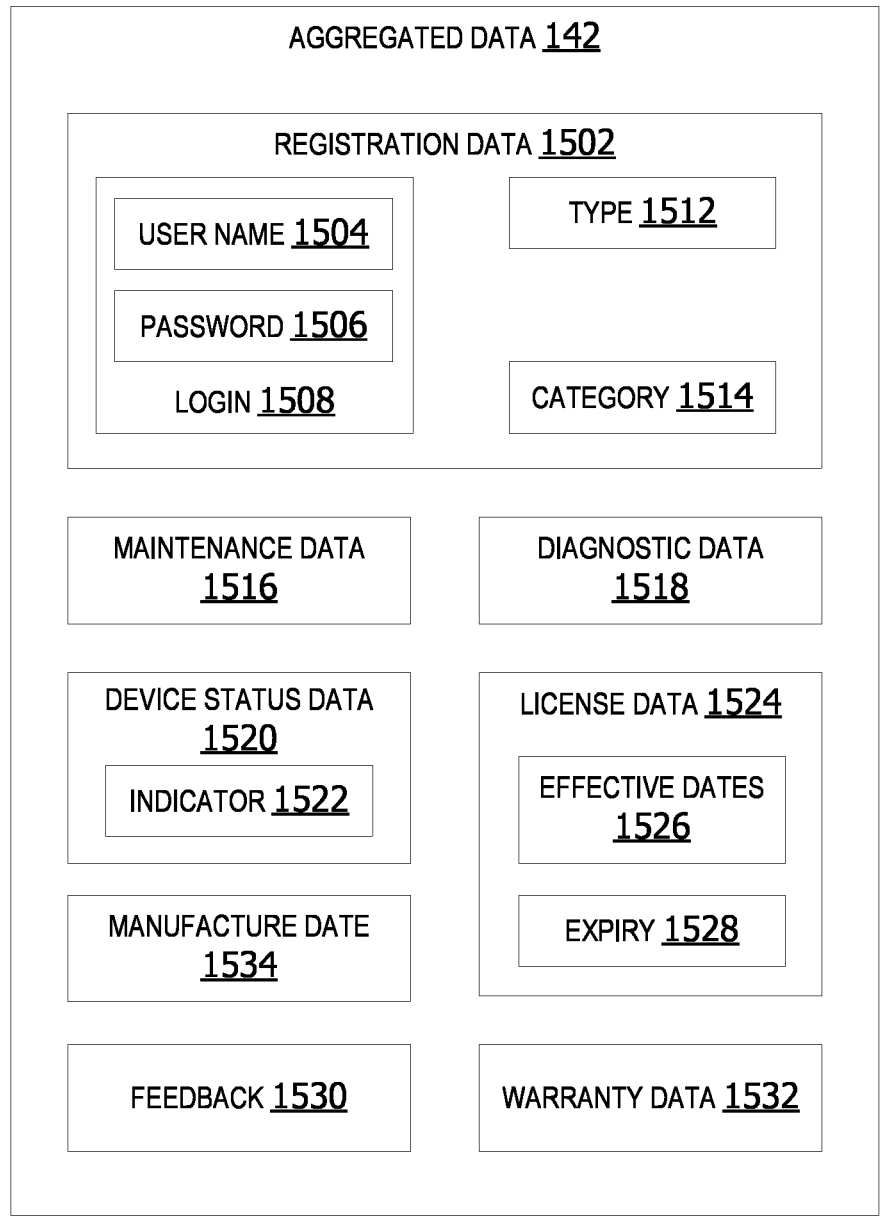
FIG. 15 is an exemplary block diagram illustrating aggregated data stored in a data store.

FIG. 15 is an exemplary block diagram illustrating aggregated data 142 stored in a data store. The aggregated data 142 in some examples includes user registration data, such as, a username 1504 and password 1506 or other login 1508 data. The aggregated data can optionally include a device ID, such as a UID, device type 1512 and/or device category 1514. The device type 1512 can be a multicolor light device or a siren device. The category can indicate whether the device is a surface mount device, a light bar, or other category of light device.

In still other examples, the aggregated data 142 includes maintenance data 1516. The maintenance data can include identification of maintenance tasks which have been performed, the date on which the tasks were performed/completed, scheduled dates for future maintenance, etc. Diagnostic data 1518 is data associated with diagnostic tests performed on devices. Device status data 1520 includes an indicator 1522 indicating whether a given function is in a locked state or an unlocked state.

In still other examples, the aggregated data 142 includes license data 1524. The license data 1524 includes an identification of the function, license start date, license expiration (expiry) date 1528, and/or effective dates 1526 for the license. The license data is used to generate license renewal/ license expiration data.

The aggregated data can optionally also include user feedback 1530 and/or device warranty data 1532. The warranty data can include a warranty effective dates, expiration date, etc. The warranty data 1532 can be used to generate warranty renewal reminders.

Figure 16:
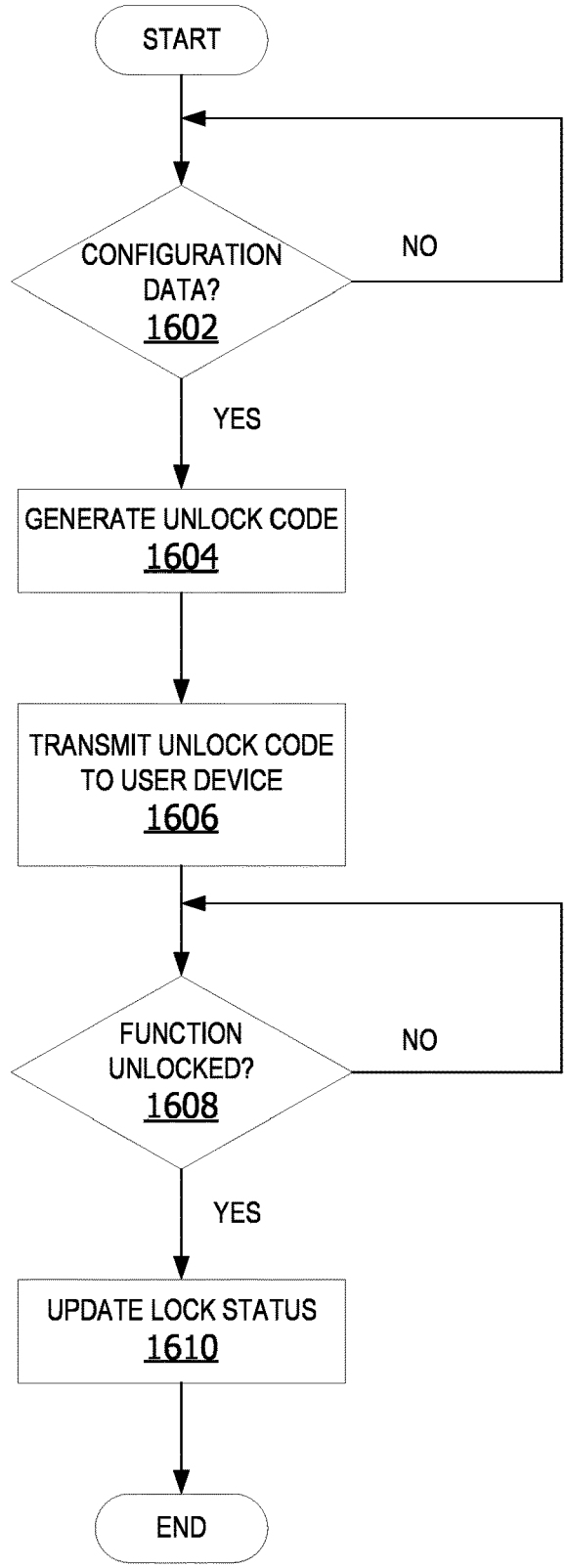
FIG. 16 is an exemplary flow chart illustrating operation of the computing device to update a lock status on a lockable device.

FIG. 16 is an exemplary flow chart illustrating operation of the computing device to update a lock status on a lockable device. The process shown in FIG. 16 is performed by a remote device manager, executing on a computing device, such as the remote device management server 126 or the user device 114 in FIG. 1.

The process begins by determining if configuration data is received from a user device at 1602. If yes, the remote device manager generates an unlock code for each function to be unlocked in accordance with the configuration data at 1604. The remote device manager transmits the unlock code to the user device at 1606. If the function on the lockable device is unlocked at 1608, the remote device manager updates the lock status at 1610. The process terminates thereafter.

While the operations illustrated in FIG. 16 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 16.

Figure 17:
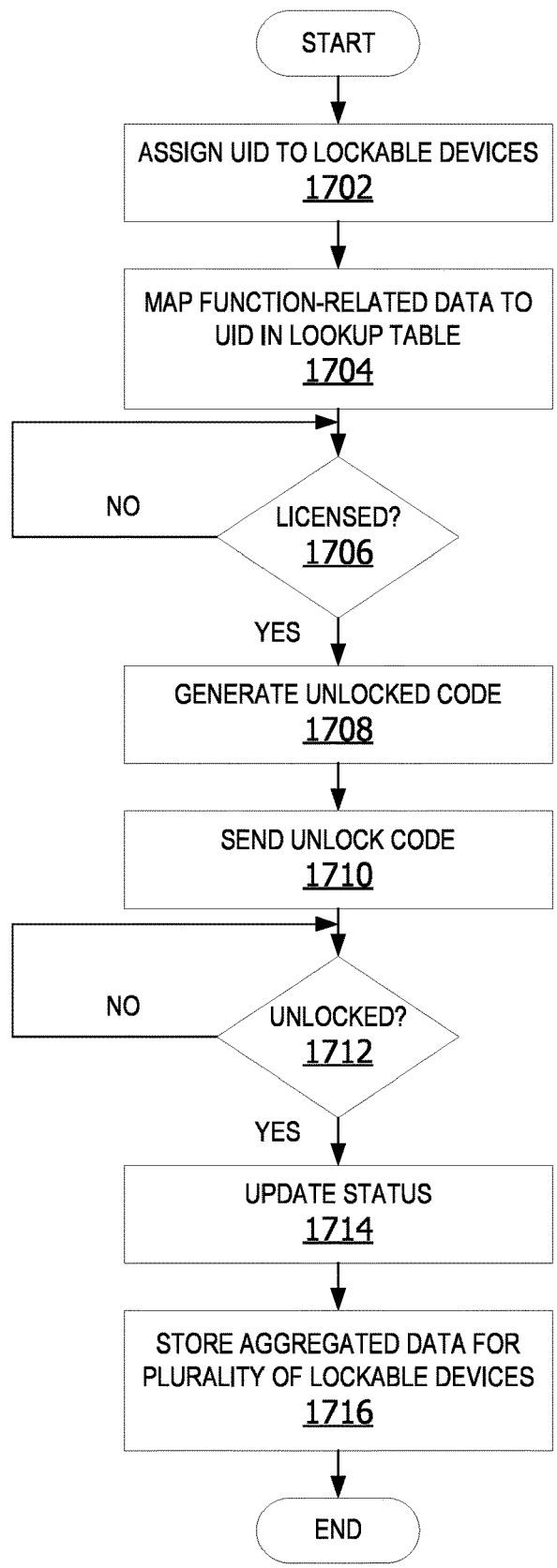
FIG. 17 is an exemplary flow chart illustrating operation of the computing device to generate unlock codes for available functions on a lockable device.

FIG. 17 is an exemplary flow chart illustrating operation of the computing device to generate unlock codes for available functions on a lockable device. The process shown in FIG. 16 is performed by a remote device manager, executing on a computing device, such as the remote device management server 126 or the user device 114 in FIG. 1.

The process begins by assigning a UID to a lockable device at 1702. The remote device manager maps function-related data to the UID in a lookup table at 1704. The remote device manager determines if a locked function is licensed by a user at 1706. If yes, the remote device manager generates an unlock code at 1708. The remote device manager sends the unlock code to the user device at 1710. The remote device manager determines if the function is unlocked at 1712. If yes, the remote device manager updates the status of the function at 1714. The remote device manager stores aggregated data for a plurality of lockable devices in a data store at 1716. The aggregated data includes the status update. The process terminates thereafter.

While the operations illustrated in FIG. 17 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 17.

Figure 18:
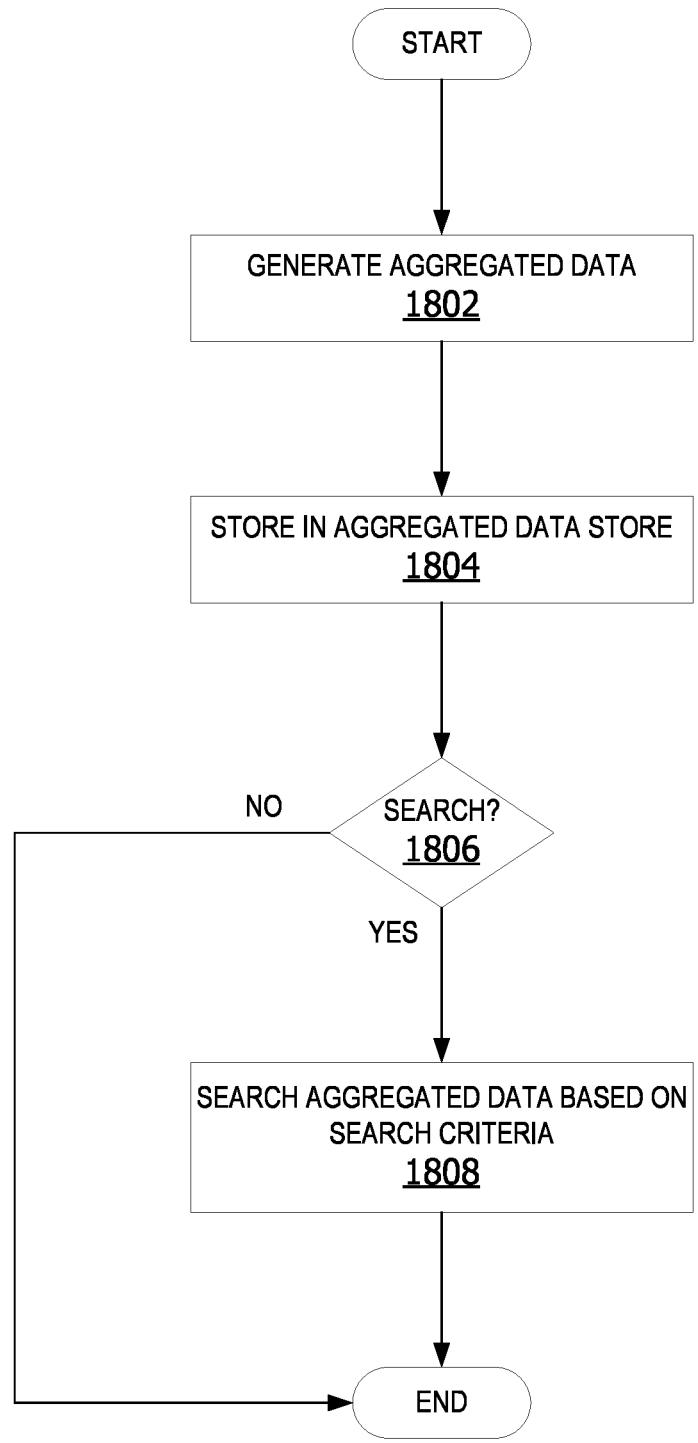
FIG. 18 is an exemplary flow chart illustrating operation of the computing device to search and sort aggregated data.

FIG. 18 is an exemplary flow chart illustrating operation of the computing device to search and sort aggregated data. The process shown in FIG. 18 is performed by a remote device manager, executing on a computing device, such as the remote device management server 126 or the user device 114 in FIG. 1.

The process begins by generating aggregated data for a plurality of lockable devices at 1802. The remote device manager stores the aggregated data in a data store at 1804. A determination is made whether a search is requested at 1806. If yes, the remote device manager searches aggregated data based on the user-provided search criteria at 1808. The process terminates thereafter.

While the operations illustrated in FIG. 18 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 18.

Figure 19:
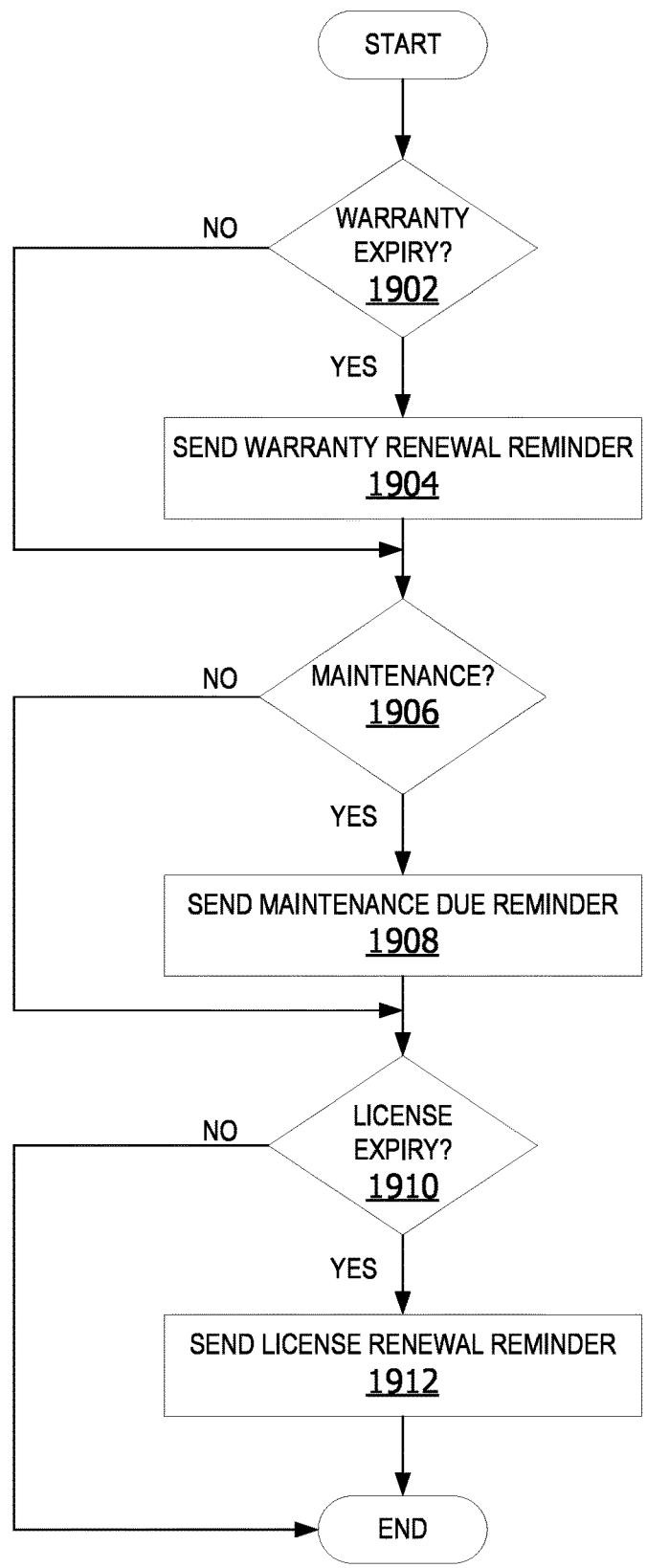
FIG. 19 is an exemplary flow chart illustrating operation of the computing device to generate reminders for users.

FIG. 19 is an exemplary flow chart illustrating operation of the computing device to generate reminders for users. The process shown in FIG. 19 is performed by a remote device manager, executing on a computing device, such as the remote device management server 126 or the user device 114 in FIG. 1.

The process begins by determining is a warranty is expired at 1902. If yes, a warranty renewal reminder is sent to the user device at 1904. A determination is made whether maintenance is due on the lockable device at 1906. If yes, the remote device manager sends a maintenance due reminder to the user device at 1908. The remote device manager determines if a license expiry date is approaching at 1910. In some examples, the expiration date is approaching if the expiration date is within a predetermined time-period from the current date. If yes, the remote device manager sends a license renewal reminder at 1912. The process terminates thereafter.

While the operations illustrated in FIG. 19 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 19.

Figure 20:
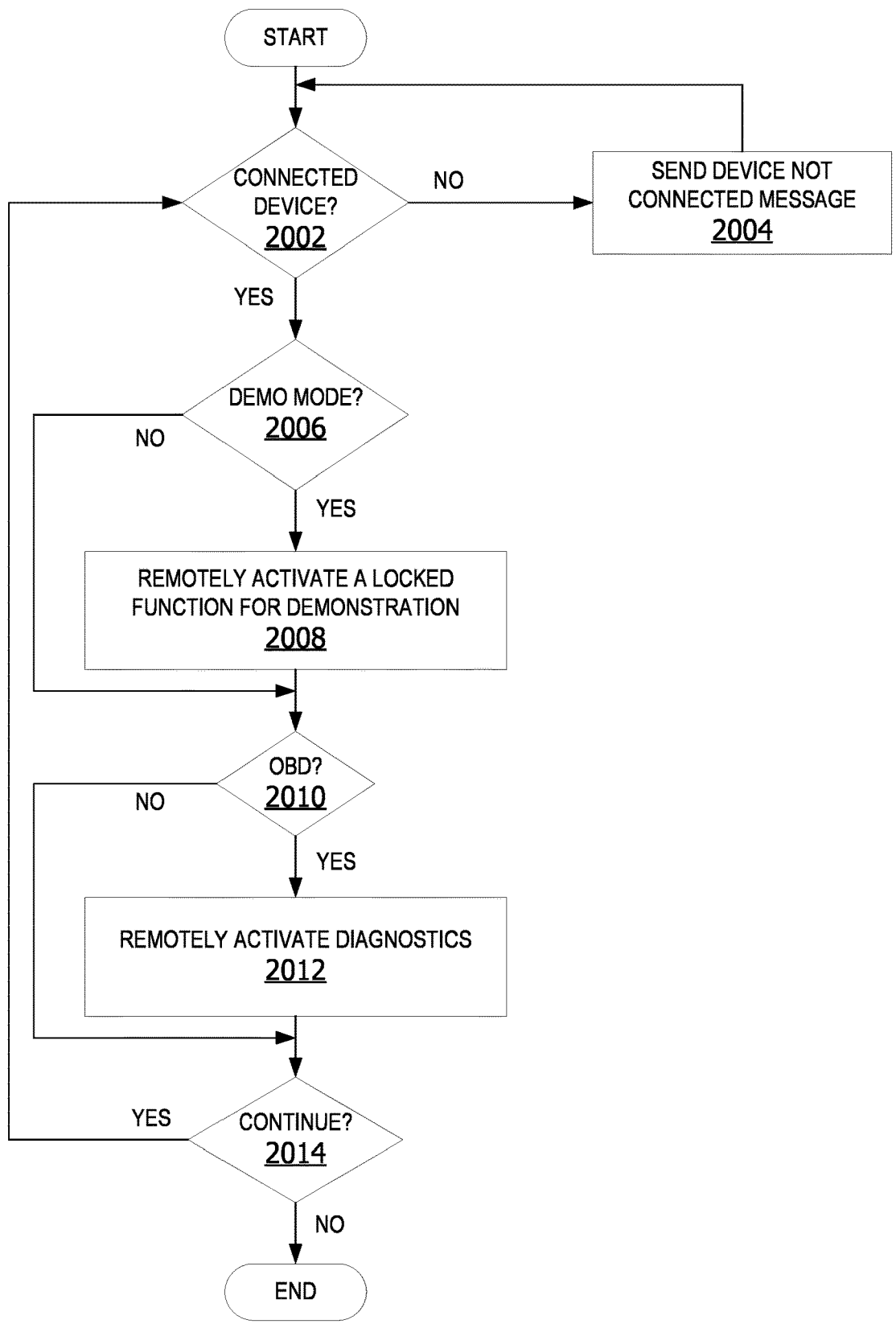
FIG. 20 is an exemplary flow chart illustrating operation of the computing device to remotely activate function demonstrations and diagnostics on lockable devices.

FIG. 20 is an exemplary flow chart illustrating operation of the computing device to remotely activate function demonstrations and diagnostics on lockable devices. The process shown in FIG. 20 is performed by a remote device manager, executing on a computing device, such as the remote device management server 126 or the user device 114 in FIG. 1.

The process begins by determining if a lockable device is connected to a user device logged into the portal page at 2002. If no, a "device not connected" message is sent at 2004. If the device is connected, a determination is made whether a demo mode is requested at 2006. The demo mode is a demonstration mode in which a locked function is permitted to operate while the device is connected to the user device. If yes, the locked function is remotely activated for demonstration at 2008. A determination is made whether an on-board diagnostics is being triggered at 2010. If yes, remotely activate diagnostics at 2012. A determination is made whether to continue at 2014. If yes, the process returns to 2002 and iteratively executes operations 2002 through 2014 until a decision is made to not continue at 2014. The process terminates thereafter.

While the operations illustrated in FIG. 20 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 20.

Additional Examples

Alternatively, or in addition to the other examples described herein, examples include any combination of the following:

- a code generator executing on the at least one processor that generates a unique identifier (UID) for each lockable device in a plurality of lockable devices, wherein a plurality of UIDs associated with the plurality of lockable device is stored on aggregated data storage device;
- a lookup table maps a UID associated with the lockable device to the function-related data associated with the at least one available function;
- the lockable device is a multicolor lightbar and wherein the at least one available function comprises at least one of a combination of colored lights and a flash pattern;
- a remote device manager executed by the at least one processor that remotely activates a diagnostics mode or a demonstration mode of the lockable device while the lockable device is connected to the user computing device, the demonstration mode enables the at least one available function to operate while in a locked state;
- a feedback component executed on the at least one processor that obtains feedback from a plurality of users associated with the plurality of lockable devices, wherein the feedback is stored in aggregated data;
- a sorting component executed on the at least one processor that sorts the aggregated data based on user-selected search criteria across the plurality of lockable devices;
- a notification engine executed on the at least one processor that generates a reminder associated with the selected lockable device, the reminder comprising at least one of a warranty reminder, a maintenance reminder, and a license renewal reminder;
- a registration component executed on the at least one processor that obtains user registration data associated with the selected lockable device, the user registration data used to login a user to a portal webpage enabling the user to generate configuration data for unlocking available functions on one or more lockable devices;
- an inventory tracking system storing inventory data indicating a number of lockable devices in inventory available for installation on one or more emergency vehicles and a number of lockable devices currently in-service;
- receiving configuration data including a request to unlock an available function of a lockable device from a user device via a network connection, the configuration data comprising a UID associated with the lockable device, the lockable device comprising a multicolor device or a siren device having the available function in a locked state preventing operation of the available function;

generating a unique per-device unlock code based on the configuration data received from the user device, the unlock code enabling operation of the at least one available function for a predetermined time-period in response to the selected lockable device receiving the unlock code;

sending the unlock code to the user device via the network connection, wherein the user device utilizes the unlock code to unlock the available function enabling operation of the at least one available function for the predetermined time-period in accordance with at least one parameter specified in the configuration data;

updating a lock status indicator associated with the lockable device from a locked status indicator to an unlocked status indicator, lock status indicator included with in function-related data stored in an aggregated data store;

storing aggregated function-related data for a plurality of lockable devices in the aggregated data store, the plurality of lockable devices comprising a set of devices installed on emergency vehicles and a set of lockable devices in inventory ready for installation on one or more emergency vehicles;

searching the aggregated function-related data in accordance with user-selected search criteria to identify maintenance issues across the plurality of lockable devices;

mapping the UID associated with the lockable device to the function-related data stored in the aggregated data store to identify whether an available function is locked or unlocked;

remotely activating a diagnostics mode of the lockable device while the lockable device is connected to the user computing device;

remotely activating a demonstration mode of the lockable device while the lockable device is connected to the user computing device, the demonstration mode enables the at least one available function to operate while in a locked state;

obtaining feedback from a plurality of users associated with the plurality of lockable devices, wherein the feedback is stored in aggregated data;

sending a reminder associated with the selected lockable device, the reminder comprising at least one of a warranty reminder, a maintenance reminder, and a license renewal reminder;

assign a UID to a selected lockable device, the lockable device comprising a multicolor device or a siren device configured for installation on an emergency vehicle, the lockable device having at least one available function in a locked state preventing operation of the at least one available function; receive, from a user device, configuration data including a request to unlock the at least one available function of the lockable device, the configuration data comprising the UID assigned to the lockable device;

generate a unique per-device unlock code based on the configuration data, the unlock code enabling operation of the at least one available function for a predetermined time-period in response to the selected lockable device receiving the unlock code;

send the unlock code to the user device via a network connection, wherein the user device utilizes the unlock code to unlock the available function enabling operation of the at least one available function for the predetermined time-period in accordance with at least one parameter specified in the configuration data;

update a lock status indicator associated with the lockable device from a locked status indicator to an unlocked status indicator, lock status indicator included with in function-related data stored in an aggregated data store;

store aggregated function-related data for a plurality of lockable devices in the aggregated data store, the plurality of lockable devices comprising a set of lockable devices installed on emergency vehicles and a set of lockable devices in inventory ready for installation on one or more emergency vehicles;

remote activation of a demonstration mode of the lockable device while the lockable device is connected to the user computing device, the demonstration mode enables the at least one available function to operate while in a locked state to demonstrate the available function to a user prior to completing a licensing process to unlock the at least one available function; and send a reminder associated with the selected lockable device, the reminder comprising at least one of a warranty reminder, a maintenance reminder, and a license renewal reminder.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15.

In some examples, the operations illustrated in FIG. 16, FIG. 17, FIG. 18, FIG. 19, and FIG. 20 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of remote lockable device management the method comprising receiving configuration data including a request to unlock an available function of a lockable device from a user device via a network connection, the configuration data comprising a UID associated with the lockable device, the lockable device comprising a multicolor device or a siren device having the available function in a locked state preventing operation of the available function; generating a unique per-device unlock code based on the configuration data received from the user device, the unlock code enabling operation of the at least one available function for a predetermined time-period in response to the selected lockable device receiving the unlock code; sending the unlock code to the user device via the network connection, wherein the user device utilizes the unlock code to unlock the available function enabling operation of the at least one available function for the predetermined time-period in accordance with at least one parameter specified in the configuration data; and updating a lock status indicator associated with the lockable device from a locked status indicator to an unlocked status indicator, lock status indicator included with in function-related data stored in an aggregated data store.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for remote management of functions on a lockable device. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, and FIG. 15, such as when encoded to perform the operations illustrated in FIG. 16, FIG. 17, FIG. 19 and FIG. 20, constitute exemplary means for assigning a UID to a selected lockable device, the lockable device comprising a multicolor device or a siren device configured for installation on an emergency vehicle, the lockable device having at least one available function in a locked state preventing operation of the at least one available function; exemplary means for receiving, from a user device, configuration data including a request to unlock the at least one available function of the lockable device, the configuration data comprising the UID assigned to the lockable device; exemplary means for generating a unique per-device unlock code based on the configuration data, the unlock code enabling operation of the at least one available function for a predetermined time-period in response to the selected lockable device receiving the unlock code; exemplary means for sending the unlock code to the user device via a network connection, wherein the user device utilizes the unlock code to unlock the available function enabling operation of the at least one available function for the predetermined time-period in accordance with at least one parameter specified in the configuration data; exemplary means for updating a lock status indicator associated with the lockable device from a locked status indicator to an unlocked status indicator, lock status indicator included with in function-related data stored in an aggregated data store; and exemplary means for storing aggregated function-related data for a plurality of lockable devices in the aggregated data store, the plurality of lockable devices comprising a set of lockable devices installed on emergency vehicles and a set of lockable devices in inventory ready for installation on one or more emergency vehicles.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for remote management of lockable devices associated with emergency vehicles, the system comprising:
   a selected lockable device configured for installation on an emergency vehicle communicatively coupled to a user device, the selected lockable device comprising at least one available function in a locked state preventing operation of the at least one available function, the selected lockable device comprising a multicolor light-bar or a siren device;
   a remote device management server comprising at least one processor communicatively coupled to a memory and having stored thereon computer-executable instructions causing the processor to:
      generate an unlock code corresponding to configuration data received from the user device for unlocking the at least one available function on the selected lockable device, the unlock code comprising a unique per-device code that enables operation of the at least one available function in response to the selected lockable device receiving the unlock code;
   a communications interface device transmits the unlock code to the user device, wherein the user device provides the unlock code to the lockable device to enable operation of the at least one available function in accordance with at least one parameter specified in the configuration data; and
   an aggregated data storage device updates a lock status of the selected lockable device to indicate a change from a locked state to an unlocked state of the at least one available function, wherein the aggregated data storage device stores function-related data associated with one or more available functions of a plurality of lockable devices, the function-related data including the lock status of the at least one available function of the selected lockable device.

2. The system of claim 1, further comprising:
   a code generator executing on at least one processor that generates a unique identifier (UID) for each lockable device in the plurality of lockable devices, wherein a plurality of UIDs associated with the plurality of lockable device is stored on aggregated data storage device; and
   a lookup table maps a UID associated with the lockable device to the function-related data associated with the at least one available function.

3. The system of claim 1, wherein the lockable device is a multicolor lightbar and wherein the at least one available function comprises at least one of a combination of colored lights and a flash pattern.

4. The system of claim 1, further comprising: a remote device manager executed by the at least one processor that remotely activates a diagnostics mode or a demonstration mode of the lockable device while the lockable device is connected to the user device, the demonstration mode enables the at least one available function to operate while in a locked state.

5. The system of claim 1, further comprising:
a feedback component executed on the at least one processor that obtains feedback from a plurality of users associated with the plurality of lockable devices, wherein the feedback is stored in aggregated data.

6. The system of claim 1, further comprising:
a sorting component executed on the at least one processor that sorts the aggregated data based on user-selected search criteria across the plurality of lockable devices.

7. The system of claim 1, further comprising:
a notification engine executed on the at least one processor that generates a reminder associated with the selected lockable device, the reminder comprising at least one of a warranty reminder, a maintenance reminder, and a license renewal reminder.

8. The system of claim 1, further comprising:
a registration component executed on the at least one processor that obtains user registration data associated with the selected lockable device, the user registration data used to login a user to a portal webpage enabling the user to generate configuration data for unlocking available functions on one or more lockable devices.

9. The system of claim 1, further comprising:
an inventory tracking system storing inventory data indicating a number of lockable devices in inventory available for installation on one or more emergency vehicles and a number of lockable devices currently in-service.

10. A method for remote management of lockable devices associated with emergency vehicles, the method comprising:
receiving configuration data including a request to unlock at least one available function of a lockable device from a user device via a network connection, the configuration data comprising a unique identifier (UID) associated with the lockable device, the lockable device comprising a multicolor device or a siren device having the at least one available function in a locked state preventing operation of the at least one available function;
generating a unique per-device unlock code based on the configuration data received from the user device, the unlock code enabling operation of the at least one available function in response to a selected lockable device receiving the unlock code;
sending the unlock code to the user device via the network connection, wherein the user device utilizes the unlock code to unlock the at least one available function enabling operation of the at least one available function in accordance with at least one parameter specified in the configuration data; and
updating a lock status indicator associated with the lockable device from a locked state to an unlocked state of the at least one available function, the lock status indicator included with in function-related data stored in an aggregated data store, wherein the function-related data is associated with one or more available functions of a plurality of lockable devices.

11. The method of claim 10, further comprising: storing aggregated function-related data for the plurality of lockable devices in the aggregated data store, the plurality of lockable devices comprising a set of devices installed on emergency vehicles and a set of lockable devices in inventory ready for installation on one or more emergency vehicles.

12. The method of claim 11, further comprising:
searching the aggregated function-related data in accordance with user-selected search criteria to identify maintenance issues across the plurality of lockable devices.

13. The method of claim 10, further comprising:
mapping the UID associated with the lockable device to the function-related data stored in the aggregated data store to identify whether an available function is locked or unlocked.

14. The method of claim 10, further comprising: activating a diagnostics mode of the lockable device remotely while the lockable device is connected to the user device.

15. The method of claim 10, further comprising: activating a demonstration mode of the lockable device remotely while the lockable device is connected to the user device, the demonstration mode enables the at least one available function to operate while in a locked state.

16. The method of claim 10, further comprising:
obtaining feedback from a plurality of users associated with a plurality of lockable devices, wherein the feedback is stored in aggregated data.

17. The method of claim 10, further comprising:
sending a reminder associated with the selected lockable device, the reminder comprising at least one of a warranty reminder, a maintenance reminder, and a license renewal reminder.

18. One or more non-transitory computer storage media having computer-executable instructions that, when executed by a processor, cause the processor to:
assign a unique identifier (UID) to a selected lockable device, the lockable device comprising a multicolor device or a siren device configured for installation on an emergency vehicle, the lockable device having at least one available function in a locked state preventing operation of the at least one available function;
receive, from a user device, configuration data including a request to unlock the at least one available function of the lockable device, the configuration data comprising the UID assigned to the lockable device;
generate a unique per-device unlock code based on the configuration data, the unlock code enabling operation of the at least one available function in response to the selected lockable device receiving the unlock code;
send the unlock code to the user device via a network connection, wherein the user device utilizes the unlock code to unlock the at least one available function enabling operation of the at least one available function in accordance with at least one parameter specified in the configuration data;
update a lock status indicator associated with the lockable device from a locked state to an unlocked state of the at least one available function, the lock status indicator included with in function-related data stored in an aggregated data store, wherein the function-related data is associated with one or more available functions of a plurality of lockable devices; and
store aggregated function-related data for the plurality of lockable devices in the aggregated data store, the plurality of lockable devices comprising a set of lockable devices installed on emergency vehicles and a set of lockable devices in inventory ready for installation on one or more emergency vehicles.

19. The one or more computer storage media of claim 18, wherein the operations further cause the processor to: remote activation of a demonstration mode of the lockable device while the lockable device is connected to the user device, the demonstration mode enables the at least one available function to operate while in a locked state to demonstrate the at least one available function to a user prior to completing a licensing process to unlock the at least one available function.

20. The one or more computer storage media of claim 18, wherein the operations further cause the processor to: send a reminder associated with the selected lockable device, the reminder comprising at least one of a warranty reminder, a maintenance reminder, and a license renewal reminder.

* * * * *